United States Patent [19]

Giles et al.

[11] 4,255,326

[45] Mar. 10, 1981

[54] NITROGEN AND/OR SULFUR CONTAINING HETEROCYCLIC AZO DYES WITH ANILINE, TETRAHYDROQUINOLINE AND BENZOMORPHOLINE COUPLERS HAVING SULFATE GROUP

[75] Inventors: Ralph R. Giles; Max A. Weaver, both of Kingsport, Tenn.

[73] Assignee: Eastman Kodak Company, Rochester, N.Y.

[21] Appl. No.: 25,685

[22] Filed: Mar. 30, 1979

[51] Int. Cl.$^3$ .................. C09B 29/08; C09B 29/26; C09B 29/36; D06P 3/24
[52] U.S. Cl. .................................. 260/152; 260/141; 260/155; 260/156; 260/157; 260/158; 260/162; 260/163; 260/208; 260/458 C; 544/105; 546/172
[58] Field of Search ............... 260/152, 157, 158, 155, 260/156, 162, 163

[56] References Cited

U.S. PATENT DOCUMENTS

| | | | |
|---|---|---|---|
| 2,659,719 | 11/1953 | Dickey et al. | 260/158 |
| 3,586,663 | 6/1971 | Kruckenberg | 260/158 X |

FOREIGN PATENT DOCUMENTS 1021399  3/1966  United Kingdom .................. 260/158

*Primary Examiner*—Floyd D. Higel
*Attorney, Agent, or Firm*—Donald W. Spurrell; Daniel B. Reece, III

[57] ABSTRACT

Disclosed are azo dyes prepared by diazotizing heterocyclic amines such as 2-aminobenzothiazole, 3-amino-2,1-benzisothiazole, 5-amino-1,2,4-thiadiazole, 5-aminoisothiazole, 5-aminopyrazole, 2-aminothiophene and 2-amino-1,3,4-thiadiazole, followed by coupling with certain aniline, tetrahydroquinoline, or benzomorpholine compounds containing sulfate groups. These amines may be substituted with a large variety of groups including lower alkyl, lower alkoxy, cyano, carbamoyl, sulfamoyl, and halogen. These dyes have excellent dyeing properties on polyamide fibers and also impart color to cellulose acetate fibers and wool.

32 Claims, No Drawings

NITROGEN AND/OR SULFUR CONTAINING HETEROCYCLIC AZO DYES WITH ANILINE, TETRAHYDROQUINOLINE AND BENZOMORPHOLINE COUPLERS HAVING SULFATE GROUP

This invention concerns novel dyes which comprise heterocyclic diazo moieties and aromatic amine couplers having sulfate groups. These dyes are substantially water soluble and are particularly useful for dyeing polyamide, wool and the like and exhibit excellent properties including fastness to light and dyeability.

The dyes of this invention correspond to the following general formula:

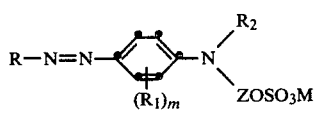

wherein R is a heterocyclic diazo radical which may be substituted as further defined below; $R_1$ is selected from groups such as hydrogen, lower alkyl and lower alkoxy each of which may be substituted, halogen, acylamido, lower alkylthio and aryloxy; $R_2$ is selected from hydrogen, lower alkyl which may be substituted, lower alkenyl, aryl or cycloalkyl which also may be substituted, and $R_2$ may in conjunction with $R_1$ also form a 1,2,3,4-tetrahydroquinoline or a 2,3-dihydro-1,4-benzoxazine (benzomorpholine) ring; Z is a linking group such as lower alkylene; M is $H^+$, $Na^+$, $K^+$, or $NH_4^+$; and m is 0, 1 or 2. The various alkyl, alkylene, alkenyl, alkoxy, alkanoyl and the like groups within the above definitions may be straight or branched chain and the types and degree of substitutions thereof and also on the cyclic moieties as further defined below must, of course, be judiciously selected as known to those skilled in the art. The term "lower" as used throughout the specification and claims denotes 1–6 carbons.

More particularly the dyes correspond to the formula above wherein R represents the following radicals I through VII:

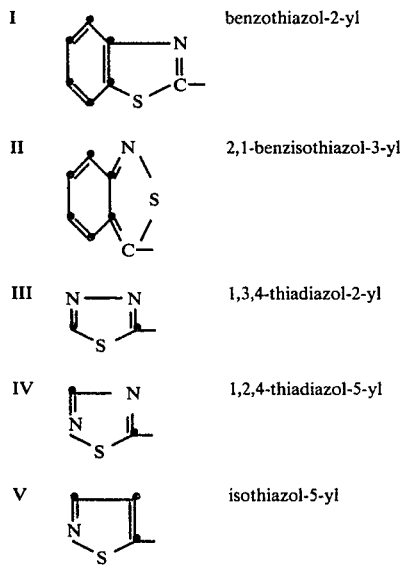

I benzothiazol-2-yl
II 2,1-benzisothiazol-3-yl
III 1,3,4-thiadiazol-2-yl
IV 1,2,4-thiadiazol-5-yl
V isothiazol-5-yl

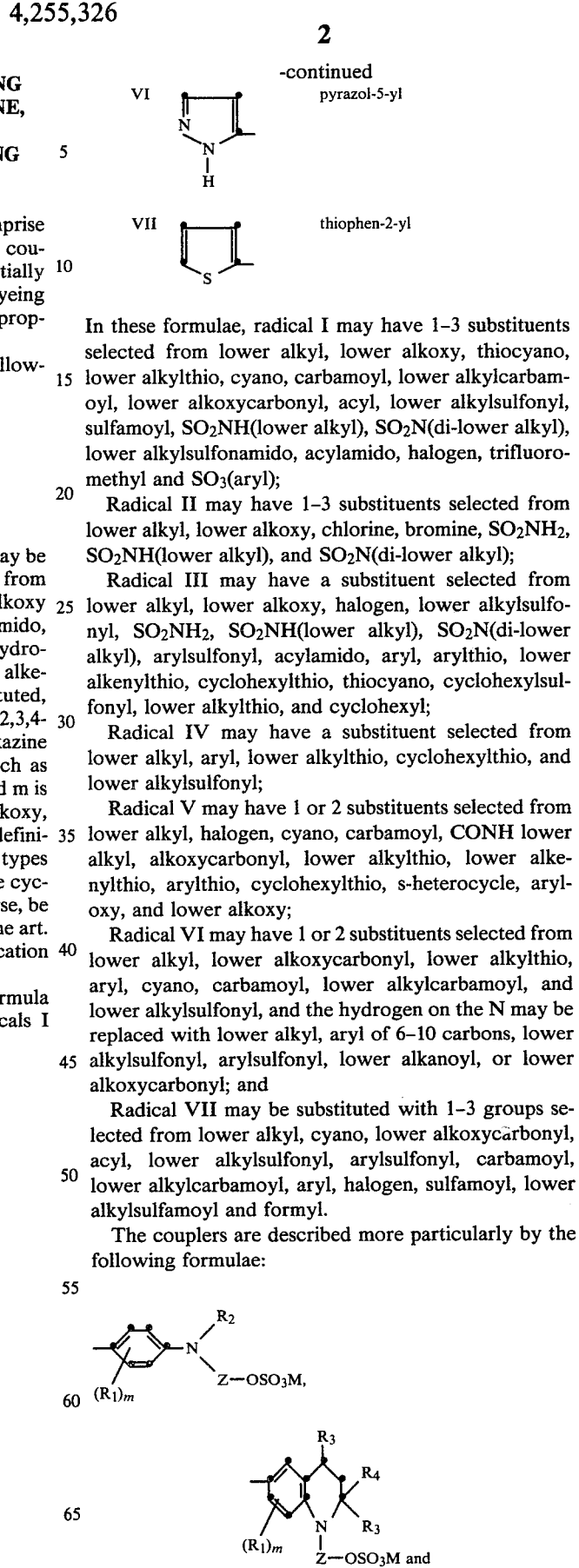

VI pyrazol-5-yl
VII thiophen-2-yl

In these formulae, radical I may have 1–3 substituents selected from lower alkyl, lower alkoxy, thiocyano, lower alkylthio, cyano, carbamoyl, lower alkylcarbamoyl, lower alkoxycarbonyl, acyl, lower alkylsulfonyl, sulfamoyl, $SO_2NH$(lower alkyl), $SO_2N$(di-lower alkyl), lower alkylsulfonamido, acylamido, halogen, trifluoromethyl and $SO_3$(aryl);

Radical II may have 1–3 substituents selected from lower alkyl, lower alkoxy, chlorine, bromine, $SO_2NH_2$, $SO_2NH$(lower alkyl), and $SO_2N$(di-lower alkyl);

Radical III may have a substituent selected from lower alkyl, lower alkoxy, halogen, lower alkylsulfonyl, $SO_2NH_2$, $SO_2NH$(lower alkyl), $SO_2N$(di-lower alkyl), arylsulfonyl, acylamido, aryl, arylthio, lower alkenylthio, cyclohexylthio, thiocyano, cyclohexylsulfonyl, lower alkylthio, and cyclohexyl;

Radical IV may have a substituent selected from lower alkyl, aryl, lower alkylthio, cyclohexylthio, and lower alkylsulfonyl;

Radical V may have 1 or 2 substituents selected from lower alkyl, halogen, cyano, carbamoyl, CONH lower alkyl, alkoxycarbonyl, lower alkylthio, lower alkenylthio, arylthio, cyclohexylthio, s-heterocycle, aryloxy, and lower alkoxy;

Radical VI may have 1 or 2 substituents selected from lower alkyl, lower alkoxycarbonyl, lower alkylthio, aryl, cyano, carbamoyl, lower alkylcarbamoyl, and lower alkylsulfonyl, and the hydrogen on the N may be replaced with lower alkyl, aryl of 6–10 carbons, lower alkylsulfonyl, arylsulfonyl, lower alkanoyl, or lower alkoxycarbonyl; and Radical VII may be substituted with 1–3 groups selected from lower alkyl, cyano, lower alkoxycarbonyl, acyl, lower alkylsulfonyl, arylsulfonyl, carbamoyl, lower alkylcarbamoyl, aryl, halogen, sulfamoyl, lower alkylsulfamoyl and formyl.

The couplers are described more particularly by the following formulae:

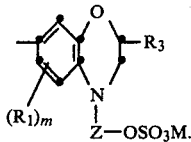

In these formulae:

$R_1$ is selected from hydrogen, lower alkyl, lower alkoxy, halogen, acylamido, lower alkylthio, and aryloxy;

$R_2$ is selected from hydrogen, aryl, cycloalkyl, and lower alkyl;

$R_3$ and $R_4$ are each selected from hydrogen and lower alkyl; m is 0, 1 or 2; M is $Na^+$, $K^+$, $H^+$ or $NH_4^+$; Z is selected from straight or branched chain lower alkylene which may be substituted, for example, with aryl, phenyl, halogen, $OSO_3M$, lower alkoxy or aryloxy, $—CH_2(CH_2)_nX—CH_2(CH_2)_p—$, where n is 1, 2 or 3, p is 0, 1, 2 or 3, and X is O, S, $SO_2$, $—SO_2NH—$, $—SO_2N$(lower alkyl)—, $SO_2N$(aryl) $—N(SO_2$ aryl)—, $—NHCO—$, $—NHCONH$, $—N(SO_2$ lower alkyl), and $—CON$(lower alkyl); and in all of the above definitions of groups containing lower alkyl, lower alkylene, or cyclic radicals, such radicals may bear up to three substituents selected from hydroxy, lower alkoxy, aryl, aryloxy, cyclohexyl, furyl, lower alkylcyclohexyl, aroyloxy, lower alkoxycarbonyl, lower alkanoyloxy, sulfamoyl, $SO_2NH$(aryl), $SO_2NH$(lower alkyl), $SO_2N$-(di-lower alkyl), NHCOO(lower alkyl), NHCONH(-lower alkyl), acylamido particularly where the acyl moiety is lower alkanoyl, lower alkylsulfonamido, succinimido, glutarimido, phthalimido, 2-pyrrolidono, cyano, carbamoyl, lower alkylcarbamoyl, lower alkoxyalkoxy, lower alkylthio, halogen, arylthio, lower alkylsulfonyl and arylsulfonyl.

The dyes of this invention impart orange to blue shades on fibers, particularly polyamides, and are especially useful for dyeing polyamide (nylon) carpets, giving good fastness to light, ozone, oxides of nitrogen, washing, sublimation, crocking, and the like, and having good leveling, transfer, exhaustion and build properties.

The heterocyclic amines used in this invention are prepared according to known procedures. The dyes may be prepared as follows:

Method I

An intermediate coupler containing one or more hydroxy groups may be reacted with sulfuric acid to produce a sulfate ester, which is then coupled with a diazonium salt to give the dye, as follows:

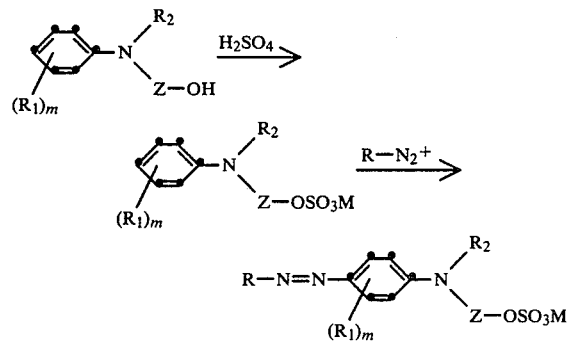

Method II

An intermediate coupler containing one or more hydroxy groups may be coupled with the diazonium salt and then the dye reacted with sulfuric acid to produce the sulfate ester, as follows:

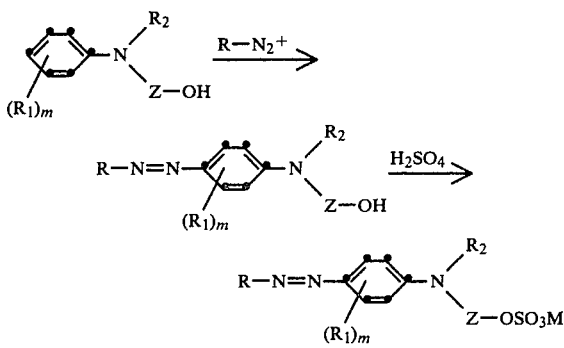

The dyes may be isolated when M is $H^+$, but are usually isolated as the sodium or potassium salts.

The following examples will further illustrate these preparative methods.

COUPLER PREPARATIONS

EXAMPLE 1

Preparation of N-Ethyl-N-2-sulfatoethyl-m-toluidine

To 75 ml of concentrated sulfuric acid is added 53.8 g. of N-ethyl-N-2-hydroxyethyl-m-toluidine with stirring, keeping the temperature below 50° C. The solution is stirred for 2 hrs. and the temperature allowed to drop. Thin-layer chromatography shows an essentially complete reaction. The viscous reaction mixture is drowned in ice-water and diluted to a total volume of about 900 ml. the coupler solution is then used to prepare the dyes without further treatment.

EXAMPLE 2

Preparation of N-Ethyl-N-2-sulfatoethylaniline

To 25 ml of concentrated sulfuric acid is added 16.5 g. of N-ethyl-N-2-hydroxyethylaniline at less than 40° C. After stirring 2 hrs. and allowing the temperature to drop, the reaction mixture is added to 200 g. of ice and diluted to a total volume of about 250 ml. An aliquot of this coupler solution is used without further treatment.

EXAMPLE 3

Preparation of 2,7-Dimethyl-N-(2,3-disulfatopropyl) 1,2,3,4-tetrahydroquinoline

To 40 g. of concentrated sulfuric acid is added 11.75 g. of N-(2,3-dihydroxypropyl)-2,7-dimethyl-1,2,3,4-tetrahydroquinoline at about 50° C. The material is difficult to dissolve and requires stirring for several hours at room temperature. After solution is completed, stirring is continued for 1 hr. and the solution drowned in 100 g. ice. The solution is used without further treatment to prepare dyes.

EXAMPLE 4

Preparation of N,N-bis(2-Sulfatoethyl)-m-toluidine

N,N-bis(2-Hydroxyethyl)-m-toluidine (1 g.) is added to 3 g. of concentrated sulfuric acid, allowed to stand at room temperature, and the reaction mixture added to 20 g. of ice. The solution is used to prepare dyes.

EXAMPLE 5

Preparation of N-(2-Sulfatoethyl)-1,2,3,4-tetrahydro-2,2,4,7-tetramethylquinoline To 250 ml of concentrated sulfuric acid is added 120 g. of N-(2-hydroxyethyl)-1,2,3,4-tetrahydro-2,2,4,7-tetramethylquinoline at less than 30° C. The solution is stirred for 2 hrs. and drowned onto 1250 g. of ice and water. After stirring for about 30 min., the white solid which precipitates is collected by filtration, washed with 10% sodium chloride solution, and dried at 60° C.

EXAMPLE 6

Preparation of N-(2-(Sulfatoethyl)-1,2,3,4-tetrahydro-2,2,4-trimethylquinoline N-(2-Hydroxyethyl)-1,2,3,4-tetrahydro-2,2,4-trimethyl-quinoline (110 g.) is treated exactly as in Example 5 to yield the sulfate product which is a white solid.

EXAMPLE 7

Preparation of N-(2-(Sulfatoethyl)-2,3-dihydro-3,6-dimethyl-1,4-benzoxazine

N-(2-Hydroxyethyl)-2,3-dihydro-3,6-dimethyl-1,4-benzoxazine (25 g.) is added at about 30° C. to concentrated sulfuric acid (50 ml). After solution is complete, stirring is continued for 1 hr. and the reaction solution drowned in ice-water to produce a total volume of about 500 ml. The coupler solution is used without further treatment.

The following are typical coupler types bearing hydroxy groups which may be treated in a similar manner as described above to produce sulfate groups.

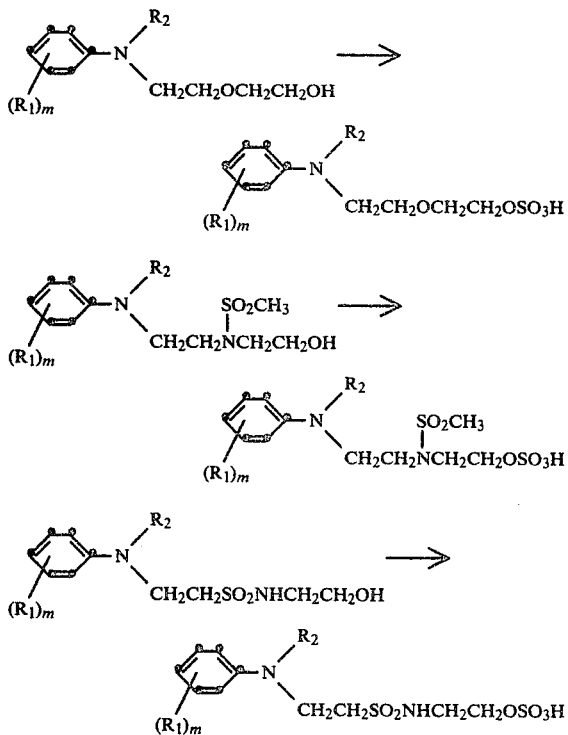

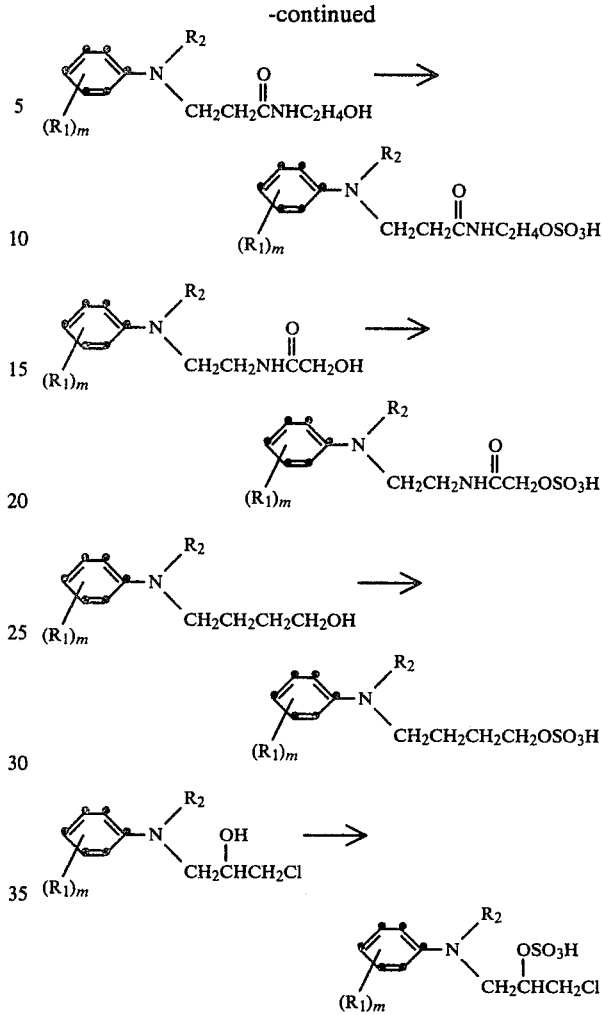

The tetrahydroquinoline and 2,3-dihydro-1,4-benzoxazine couplers can be prepared in a similar manner as illustrated by the aniline derivatives above.

PREPARATION OF THE DYES—METHOD I

EXAMPLES 8–17

Diazotization and Coupling of 2-Amino-6-methylbenzothiazole

To 150 g. of 60% acetic acid containing 10 g. of concentrated $H_2SO_4$ is added 8.2 g. (0.05 mole) of 2-amino-6-methylbenzothiazole at room temperature. The solution is cooled to $-5°$ C., and a solution of 3.6 g. $NaNO_2$ in 20 ml of concentrated $H_2SO_4$ is added below 0° C. The reaction mixture is stirred at $-5°$ to 0° C. for 1.5 hours. Each of the couplers (0.005 mole) listed below as Examples 8–17 is added to water, or a 0.005 mole aliquot of the coupler in dilute sulfuric acid is added to water, and cooled in an ice bath.

To each chilled coupler is added a 0.005 mole aliquot of the diazonium solution. The coupling mixture is treated with enough potassium acetate to neutralize the mineral acid. Water is added to the coupling mixture to a total volume of about 200 ml and the dyes collected by filtration, washed with 10% KCl solution, and dried in air. The dyes usually are admixed with about an equal weight of $K_2SO_4$ and are used for dyeing without further purification to produce red shades on polyamides.

| Example No. | |
|---|---|
| 8 | N-Ethyl-N(-2-sulfatoethyl)aniline |
| 9 | N-Ethyl-N-(2-sulfatoethyl)-m-toluidine |
| 10 | N-(2-Sulfatoethyl)-o-chloroaniline |
| 11 | 2-Methoxy-5-methyl-N-(2-sulfatoethyl)aniline |
| 12 | N,N-bis(Sulfatoethyl)-m-toluidine |
| 13 | N-(2-Sulfatoethyl)-1,2,3,4-tetrahydro-2,2,4,7-tetramethylquinoline |
| 14 | N-(2-Sulfatoethyl)-1,2,3,4-tetrahydro-2,2,4-trimethylquinoline |
| 15 | 2,7-Dimethyl-N-(2-sulfatoethyl)-1,2,3,4-tetrahydroquinoline |
| 16 | 2,3-Dihydro-3,6-dimethyl-N-(2-sulfatoethyl)-1,4-benzoxazine |
| 17 | 2,3-Dihydro-3-methyl-6-methoxy-N-(2-sulfatoethyl)-1,4-benzoxazine |

EXAMPLES 18–27

Diazotization and Coupling of 3-Amino-2,1-benzisothiazole

To 25 ml of concentrated $H_2SO_4$ is added 3.6 g. of $NaNO_2$ portionwise below 80° C. The solution is cooled and 50 ml of 1:5 acid (1 part propionic, 5 parts acetic acid) is added below 20° C. The mixture is further cooled and 3-amino-2,1-benzisothiazole (7.5 g., 0.05 m) is added, followed by 50 ml of 1:5 acid, all at 0°–5° C. The diazonium, after stirring at 0°–5° C. for 1 hr., is coupled to the couplers of Examples 8–17 in a similar manner as above to produce violet to reddish blue dyes for polyamides.

EXAMPLES 28–37

Diazotization and Coupling of 2-Amino-5-ethylthio-1,3,4-thiadiazole

Sodium nitrite (3.6 g.) is added portionwise to 25 ml of concentrated $H_2SO_4$. The solution is cooled and 100 ml of 1:5 acid is added below 15° C. The mixture is cooled and 8.05 g. (0.05 m) of 2-amino-5-ethylthio-1,3,4-thiadiazole is added below 10° C. After stirring at 0°–5° C. for 2 hrs., a 0.005 m aliquot of the diazonium salt is coupled to 0.005 m of the couplers of Examples 8–17 to produce red dyes for polyamides.

EXAMPLES 38–47

Diazotization of 5-Amino-3-ethylthio-1,2,4-thiadiazole

5-Amino-3-ethylthio-1,2,4-thiadiazole (8.05 g., 0.05 m) is diazotized exactly as described in Examples 28–37 and a 0.005 m aliquot coupled to 0.005 m portion of the couplers of Examples 8–17 in the manner previously illustrated.

EXAMPLES 48–57

Diazotization of 5-Amino-3-methyl-4-cyano isothiazole

To 25 ml of concentrated $H_2SO_4$ is added 3.6 g. of $NaNO_2$ allowing the temperature to rise. The solution is cooled and 50 ml of 1:5 acid is added below 10° C. Stirring is continued and 6.95 g. (0.05 m) of 5-amino-3-methyl-4-cyanoisothiazole is added below 5° C., followed by an additional 50 ml of 1:5 acid. After stirring at 0°–5° C. for 2 hrs., a 0.005 m aliquot of the diazonium salt is coupled to 0.005 m of the couplers of Examples 8–17 as previously described to produce rubine to violet dyes for polyamides.

EXAMPLES 58–67

Diazotization of 5-Amino-4-carbomethoxypyrazole

Nitrosyl sulfuric acid is prepared by adding 3.6 g. $NaNO_2$ to 25 ml of concentrated $H_2SO_4$. The solution is cooled and 100 ml of 1:5 acid is added below 20° C. After further cooling, 5-amino-4-carbomethoxypyrazole (7.05 g., 0.05 m) is added at 0°–5° C. and stirring continued for 2 hrs. A 0.005 m aliquot of the diazonium solution is coupled to 0.005 m. of the couplers of Examples 8–17 in the manner previously described to produce red dyes for polyamides.

EXAMPLES 68–77

Diazotization of 2-Amino-3-carbomethoxy-5-isobutyrylthiophene

To 150 g. of 60% aqueous acetic acid is added 11.35 g. (0.05 m) of 2-amino-3-carbomethoxy-5-isobutylthiophene at room temperature. Ten grams of concentrated onc. $H_2SO_4$ is added and the mixture cooled to 0° C. A solution of 3.6 g $NaNO_2$ in 25 ml of conc. $H_2SO_4$ is added below 10° C. and stirring continued for 1 hr. at 0°–5° C. A 0.005 m aliquot of this diazonium salt is coupled to 0.005 m portions of the couplers of Examples 8–17 as previously illustrated to produce violet to reddish-blue dyes for polyamides.

PREPARATION OF DYES—METHOD II

EXAMPLE 78

Reaction of Hydroxy Containing Dye With Sulfuric Acid and NaOH

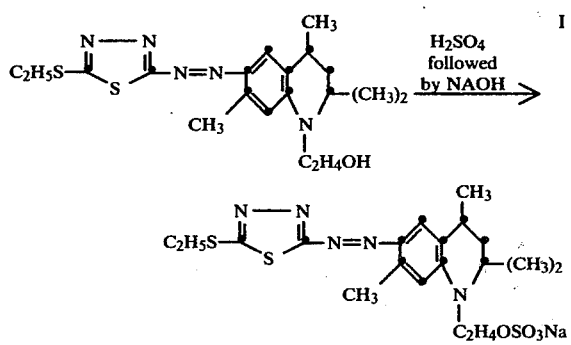

To 50 g. of concentrated $H_2SO_4$ is added 10 g. of Dye I portionwise, allowing the temperature to rise (40° C.). The temperature is then increased to about 50°–55° C. for about 30 min. After cooling to room temperature, the reaction mixture is added to 50 g. of ice and 20 ml of acetic acid. A solution of 105 g. of 50% NaOH is added, with ice for internal cooling, below 30° C. The slurry was diluted with 200 ml of water and then filtered. The solid is dried at room temperature and contains about an equal weight of dye and sodium sulfate. The dye produces bright bluish-red shades on nylon carpet.

EXAMPLE 79

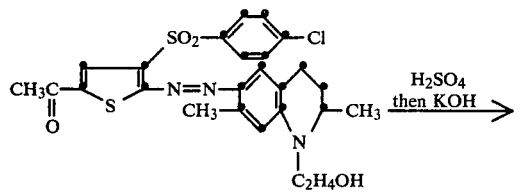

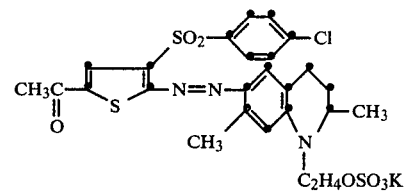

Dye II (1 g.) is added to 3 g. of concentrated $H_2SO_4$ and the mixture warmed at 45°–50° C. to complete solution. After 15 min. 10 g. of ice is added and 50% potassium hydroxide solution is added until pH of about 8 is obtained. Water (75 ml) is added and the dye collected by filtration and dried in air. The dye produces bright blue shades on polyamide fibers.

TABLE I

| Substituents on Ring A | $(R_1)_m$ | $R_2$ | Z | M |
|---|---|---|---|---|
| None | None | $C_2H_5$ | $-CH_2CH_2-$ | $K^+$ |
| " | " | $C_6H_{11}$ | " | " |
| " | " | $C_6H_5$ | " | " |
| " | $3CH_3$ | $C_2H_5$ | " | " |
| " | " | $CH_2C_6H_5$ | " | " |
| " | " | $CH_2CH_2OCH_3$ | $-CH_2CH_2CH_2CH_2-$ | " |
| " | " | $CH_2CH_2CONH_2$ | $-CH_2CH_2-$ | " |
| " | " | $CH_2CH_2Cl$ | " | " |
| " | $3-NHCOCH_3$ | $C_2H_5$ | " | " |
| " | $2-CH_3-5-NHCOCH_3$ | H | " | " |
| " | $2-OCH_3-5-CH_3$ | " | " | " |
| " | $2-Cl$ | " | " | " |
| " | $2-CH_3$ | " | " | " |
| " | $2,5-di-Cl$ | " | " | " |
| " | $2-OCH_3-5-Cl$ | " | " | " |
| $6-CH_3$ | $2-OCH_3-5-CH_3$ | " | " | " |
| " | $2,5-diCH_3$ | " | " | $Na^+$ |
| " | $3-CH_3$ | $CH_2-\text{(furan)}$ | " | " |
| " | $3-CH_3$ | $CH_2CH_2N(COCH_2)_2$ | $-CH_2CH(CH_2Cl)-$ | " |
| " | $3-CH_3$ | $CH_2CH_2N(CO)_2C_6H_4$ | $-CH_2CH_2-$ | $NH_4^+$ |
| " | $3-CH_3$ | $CH_2CH_2N(CO-CH_2)_2CH_2$ | " | $K^+$ |
| "$3-CH_3$ | $CH_2CH_2NHSO_2CH_3$ | " | " | " |
| " | $3-CH_3$ | $CH_2CH_2CH_2NHCOCH_3$ | " | " |
| $6-OCH_3$ | None | $CH_3$ | $-CH_2CH_2-$ | " |
| " | $3-CH_3$ | $CH_2CH(CH_3)_2$ | $-CH_2CH_2OCH_2CH_2-$ | " |
| " | " | $CH_2C_6H_{11}$ | $-CH_2CH_2-$ | " |
| " | " | $CH_2CH_2OC_6H_5$ | " | " |
| $6-Cl$ | " | $CH(CH_3)_2$ | " | " |
| " | H | $-CH_2CH_3$ | " | $K^+$ |
| " | " | $CH_2CH_2OCH_2CH_2OC_2H_5$ | " | " |
| $5,6-di-Cl$ | $3-CH_3$ | $-CH_2CH_3$ | " | " |
| $6-SO_2CH_3$ | " | " | " | " |
| $6-CN$ | " | " | " | " |
| $6-CONH_2$ | " | " | " | " |
| $6-COCH_3$ | $3-NHCOC_6H_5$ | " | " | " |
| $6-COC_6H_5$ | $3-NHCONHC_2H_5$ | " | " | " |
| $6-COOC_2H_5$ | $3-NHCOCH_2OCH_3$ | " | " | " |
| $6-SO_2NH_2$ | $3-NHCOC_6H_{11}$ | " | " | " |

TABLE I-continued

| Substituents on Ring A | (R₁)m | R₂ | Z | M |
|---|---|---|---|---|
| 6-SO₂N(CH₃)₂ | 3-NHCOOC₂H₅ | " | CH₂CH(CH₃)— | " |
| 6-SO₂NHC₂H₄OCH₃ | 3-NHCOCH₂CN | " | CH₂CH(CH₂OCH₃)— | " |
| 6-NHCOCH₃ | " | " | —CH₂CH₂— | " |
| 4-CF₃ | None | " | " | " |
| 6-SO₃C₆H₅ | " | " | " | " |
| 6-OC₂H₅ | 3-CH₃ | " | —CH₂CH₂SCH₂CH₂— | " |
| " | " | " | —CH₂CH₂SO₂CH₂CH₂CH₂CH₂— | " |
| " | " | " | —CH₂CH₂N(SO₂CH₃)CH₂CH₂— | " |
| " | " | " | —CH₂CH₂N(COCH₃)CH₂CH₂— | " |
| " | " | " | —CH₂CH₂SO₂NHCH₂CH₂— | " |
| 6-SCH₃ | " | " | —CH₂CH₂— | " |
| 6-SCN | " | " | " | " |
| 6-CH₃ | " | " | —CH₂CH₂CONHC₂H₄— | " |
| " | " | " | —CH₂CH₂NHCOCH₂— | " |
| " | " | " | —CH₂CH₂NHSO₂CH₂CH₂— | " |
| " | 3-NHCOC₆H₅ | " | —CH₂CH₂— | " |
| " | 3-NHCOOC₂H₅ | " | " | " |
| " | 3-CH₃ | —CH₂CH₂OSO₃Na | " | Na⁺ |
| " | " | —C₂H₅ | —CH₂CH(OSO₃Na)CH₂— | " |

TABLE 2

| Substituents on Ring A | (R₁)m | R₃ | Z | M |
|---|---|---|---|---|
| None | None | CH₃ | CH₃ —CH₂CH₂— | K⁺ |
| " | " | H | CH₃ | " |
| " | " | H | CH₃ | " |
| " | 7-CH₃ | " | " | " |
| " | " | CH₃ | " | " |
| " | 7-CH₃ | H CH(CH₃)₂ | " | " |
| " | 7-OCH₃ | " CH₃ | " | " |
| " | 5-OCH₃, 8-CH₃ | " | " | " |
| " | 5,8-di-OCH₃ | " | " | " |
| " | 5,8-di-CH₃ | " | " | " |
| " | 7-Cl | " | " | " |
| " | 5,8-di-Cl | " | " | " |
| 6-CH₃ | None | " | " | Na⁺ |
| " | 5-OCH₃, 8-CH₃ | CH₃ | " | " |
| " | 7-NHCHO | " | " | " |
| " | 7-NHCOCH₃ | " | " | " |
| " | 7-NHCOCH₂OCH₃ | " | " | " |
| " | 7-NHCOOC₂H₅ | " | " | " |
| " | 7-NHCOC₆H₅ | " | " | " |
| " | 7-NHCONHC₂H₅ | " | " | K⁺ |
| " | 7-NHCOC₆H₁₁ | " | " | " |
| 6-OCH₃ | None | " | " | " |
| " | 7-CH₃ | H | " | " |
| " | " | " | H | " |
| 6-OCH₂CH₃ | " | " | CH₃ | " |
| 6-SCH₃ | " | " | " | " |
| 6-SCN | " | " | " | " |
| 6-SO₂NH₂ | " | " | " | " |
| 6-SO₂NHC₄H₉-n | " | " | " | " |
| 6-SO₂N(CH₃)₂ | 7-OCH₃ | " | " | " |
| 6-SO₃C₆H₅ | 7-CH₃ | " | " | " |
| 6-CN | " | " | " | " |
| 6-CONH₂ | " | " | " | " |
| 4-COOCH₃ | " | " | " | " |
| 6-COCH₃ | " | " | " | " |
| 6-COC₆H₅ | " | " | " | " |
| 6-Cl | None | " | " | " |

TABLE 2-continued

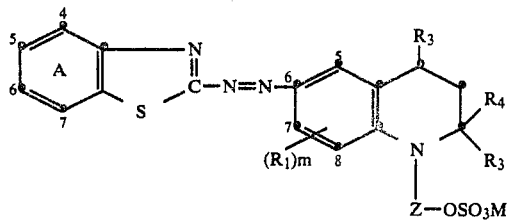

| Substituents on Ring A | $(R_1)m$ | $R_3$ | Z | M | |
|---|---|---|---|---|---|
| 5,6-di-Cl | " | " | " | " | " |
| 4-Br | " | " | " | " | " |
| 4-$CF_3$ | " | " | " | " | " |
| 6-$NHCOCH_3$ | 7-$CH_3$ | " | " | " | " |
| 6-$SO_2CH_3$ | " | " | " | " | " |
| 6-$CH_3$ | " | " | " | —$CH_2CH_2OCH_2CH_2$— | " |
| " | " | " | " | —$CH_2CH_2SCH_2CH_2$— | " |
| " | " | " | " | —$CH_2CH_2SO_2CH_2CH_2$— | " |
| " | " | " | " | —$CH_2CH_2N(SO_2CH_3)CH_2CH_2$— | " |
| " | " | " | " | —$CH_2CH_2SO_2NHCH_2CH_2$— | " |
| " | " | " | " | —$CH_2CH_2CH_2NHCOCH_2$— | " |
| None | " | " | " | —$CH_2CH_2CONHCH_2CH$— | " |
| 6-$SC_2H_4CN$ | " | " | " | —$CH_2CH_2N(COC_6H_5)CH_2CH_2$— | " |
| 6-$NHCOCH_2CN$ | " | " | " | —$CH_2CH_2(CH_3)$— | " |
| 6-$CH_3$ | " | " | " | —$CH_2CH(OSO_3Na)CH_2$— | $Na^+$ |
| " | " | " | " | —$CH_2CH(CH_2Cl)$— | " |
| " | " | " | " | —$CH_2CH(CH_2OCH_3)$— | " |
| " | " | " | " | —$CH_2CH(C_6H_5)$— | " |
| " | " | " | " | —$CH_2CH(CH_2OC_6H_5)$— | " |
| " | " | " | " | —$CH_2CH_2CH_2N(CH_3)SO_2CH_2CH_2$— | " |
| 6-$COOC_2H_4OCH_3$ | " | " | " | —$CH_2CH_2CH_2$— | " |

TABLE 3

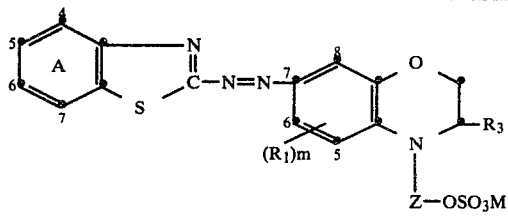

| Ring A | $(R_1)m$ | $R_3$ | Z | M |
|---|---|---|---|---|
| None | None | H | —$CH_2CH_2$— | $Na^+$ |
| " | 6-$CH_3$ | " | " | " |
| " | " | 3-$CH_3$ | " | " |
| " | 6-$OCH_3$ | " | " | " |
| 6-$CH_3$ | " | H | " | " |
| " | 6-$CH_3$ | 3-$CH_3$ | —$CH_2CH_2CH_2CH_2$— | " |
| 4-$CH_3$ | " | " | —$CH_2CH_2$— | " |
| 4-Cl | " | " | " | " |
| 4-$CF_3$ | " | " | " | " |
| 4,7-di-$CH_3$ | " | " | " | " |
| 4,7-di-Cl | " | " | " | " |
| 4-$OCH_3$, 7-Cl | " | " | " | " |
| 4-$OCH_3$, 5-$CH_3$ | " | " | " | " |
| 6-$OCH_3$ | " | " | " | " |
| " | 6-$NHCOCH_3$ | " | " | $K^+$ |
| " | 6-$NHCOC_6H_5$ | " | " | " |
| " | 6-$NHCOC_4H_9$—n | " | " | " |
| " | 6-$NHCONHC_2H_5$ | " | " | " |
| " | 6-$NHCOCH_2OCH_3$ | " | " | " |
| 6-$OC_4H_9$—n | 6-$NHCOCH_2CN$ | " | " | " |
| 6-$SCH_3$ | 6-$CH_3$ | " | " | $Na^+$ |
| 6-SCN | " | " | " | " |
| 6-$SO_2CH_3$ | " | " | " | " |
| 6-$SO_2NH_2$ | " | " | " | " |
| 6-$SO_2NHC_2H_5$ | " | " | " | " |
| 6-$SO_2N(C_2H_5)_2$ | " | " | " | " |
| 6-$SO_2NHC_2H_4OCH_3$ | " | " | " | " |
| 6-$SO_3C_6H_5$ | " | " | " | " |
| 5,6-di-Cl | " | " | " | " |
| " | 6-NHCHO | " | " | " |
| 6-CN | 6-$CH_3$ | " | " | " |
| 6-$CONH_2$ | " | " | " | " |
| 6-$COOC_2H_5$ | " | " | " | " |

TABLE 3-continued

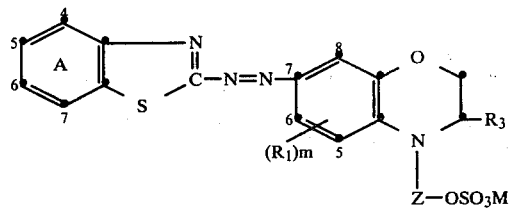

| Ring A | (R₁)m | R₃ | Z | M |
|---|---|---|---|---|
| 6-COCH₃ | " | " | " | " |
| 6-COC₆H₅ | " | " | " | " |
| 4-Br—6-SO₂CH₃ | " | " | " | " |
| 6-SCH₂CH₂CN | " | " | " | " |
| 6-SO₂CH₂CH₂CN | " | " | " | " |
| 6-CH₃ | " | " | —CH₂CH(CH₃)— | " |
| " | " | " | —CH₂CH(C₆H₅)— | " |
| " | " | " | —CH₂CH(CH₂Cl)— | " |
| " | " | " | —CH₂CH(OSO₃K)CH₂— | " |
| " | " | " | —CH₂CH(CH₂OC₆H₅)— | " |
| " | " | " | —CH₂CH₂OCH₂CH₂— | " |
| " | " | " | —CH₂CH₂SCH₂CH₂— | " |
| " | " | " | —CH₂CH₂SO₂CH₂CH₂— | " |
| " | " | " | —CH₂CH₂N(SO₂CH₃)CH₂CH₂— | " |
| " | " | " | —CH₂CH₂N(SO₂C₆H₅)CH₂CH₂— | " |
| " | " | " | —CH₂CH₂SO₂N(CH₃)CH₂CH₂— | " |
| " | " | " | —CH₂CH₂NHCOCH₂— | " |
| " | " | " | —CH₂CH₂CH₂NHSO₂CH₂CH₂— | " |
| " | " | " | —CH₂CH₂CONHCH₂CH₂— | " |
| " | " | " | —CH₂CH₂CONHCH₂CH₂CH₂— | " |
| " | " | " | —CH₂CH₂SO₂N(C₆H₅)CH₂CH₂— | " |
| " | " | " | —CH₂CH₂NHCONHCH₂CH₂— | " |
| 6-COOCH₂CH₂OC₂H₅ | " | " | —CH₂CH₂CH₂— | " |
| " | " | " | —CH₂CH₂CH₂CH₂—S—CH₂CH₂— | " |

TABLE 4

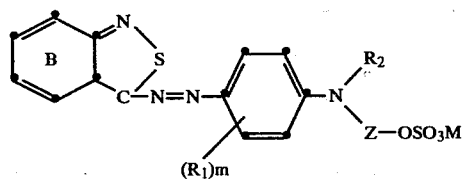

| Substitution Ring B | (R₁)m | R₂ | Z | M |
|---|---|---|---|---|
| 6-CH₃ | None | C₂H₅ | —CH₂CH₂— | K⁺ |
| None | " | C₆H₁₁ | " | " |
| " | " | C₆H₅ | " | " |
| 6-CH₃ | 3CH₃ | C₂H₅ | " | " |
| None | " | CH₂C₆H₅ | " | " |
| " | " | CH₂CH₂OCH₃ | —CH₂CH₂CH₂CH₂— | " |
| " | " | CH₂CH₂CONH₂ | —CH₂CH₂— | " |
| " | " | CH₂CH₂Cl | " | " |
| " | 3-NHCOCH₃ | C₂H₅ | " | " |
| " | 2-CH₃—5-NHCOCH₃ | H | " | " |
| 6-OCH₃ | 2-OCH₃—5-CH₃ | " | " | " |
| " | 2-Cl | " | " | " |
| None | 2-CH₃ | " | " | " |
| " | 2,5-di-Cl | " | " | " |
| " | 2-OCH₃—5-Cl | " | " | " |
| 6-CH₃ | 2-OCH₃—5-CH₃ | " | " | " |
| None | 2,5-di-CH₃ | " | " | " |
| " | 3-CH₃ | CH₂–(oxetane) | | |
| " | 3-CH₃ | CH₂CH₂N(COCH₂)₂ | —CH₂CH(CH₂Cl)— | " |
| " | 3-CH₃ | CH₂CH₂N(CO)₂C₆H₄ (phthalimido) | —CH₂CH₂— | NH₄⁺ |

TABLE 4-continued

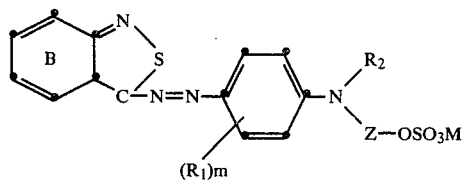

| Substitution Ring B | $(R_1)m$ | $R_2$ | Z | M |
|---|---|---|---|---|
| " | 3-CH$_3$ | CH$_2$CH$_2$N(CO—CH$_2$)(CH$_2$)CH(CH$_2$) | " | K$^+$ |
| " | 3-CH$_3$ | CH$_2$CH$_2$NHSO$_2$CH$_3$ | " | " |
| " | 3-CH$_3$ | CH$_2$CH$_2$CH$_2$NHCOCH$_3$ | " | " |
| 5-Cl | None | CH$_3$ | —CH$_2$CH$_2$— | " |
| 5-Br | 3-CH$_3$ | CH$_2$CH(CH$_3$)$_2$ | —CH$_2$CH$_2$OCH$_2$CH$_2$— | " |
| 6-SO$_2$NH$_2$ | " | CH$_2$C$_6$H$_{11}$ | —CH$_2$CH$_2$— | " |
| 6-SO$_2$NHC$_2$H$_5$ | " | CH$_2$CH$_2$OC$_6$H$_5$ | " | " |
| 6-SO$_2$N(CH$_3$)$_2$ | " | CH(CH$_3$)$_2$ | " | " |
| 6-SO$_2$NHC$_3$H$_6$OCH$_3$ | H | —CH$_2$CH$_3$ | " | K$^+$ |
| 5-Cl | " | CH$_2$CH$_2$OCH$_2$CH$_2$OC$_2$H$_5$ | " | " |
| " | 3-CH$_3$ | —CH$_2$CH$_3$ | " | " |
| " | " | " | " | " |
| " | " | " | " | " |
| None | 3-NHCOC$_6$H$_5$ | " | " | " |
| " | 3-NHCONHC$_2$H$_5$ | " | " | " |
| " | 3-NHCOCH$_2$OCH$_3$ | " | " | " |
| " | 3-NHCOC$_6$H$_{11}$ | " | " | " |
| " | 3-NHCOOC$_2$H$_5$ | " | CH$_2$CH(CH$_3$)— | " |
| " | 3-NHCOCH$_2$CN | " | CH$_2$CH(CH$_2$OCH$_3$)— | " |
| 6-SO$_2$NHCH$_3$ | " | " | —CH$_2$CH$_2$— | " |
| " | None | " | " | " |
| None | 3-CH$_3$ | " | —CH$_2$CH$_2$SCH$_2$CH$_2$— | " |
| " | " | " | —CH$_2$CH$_2$SO$_2$CH$_2$CH$_2$CH$_2$CH$_2$— | " |
| " | " | " | —CH$_2$CH$_2$N(SO$_2$CH$_3$)CH$_2$CH$_2$— | " |
| " | " | " | —CH$_2$CH$_2$N(COCH$_3$)CH$_2$CH$_2$— | " |
| " | " | " | —CH$_2$CH$_2$SO$_2$NHCH$_2$CH$_2$— | " |
| " | " | " | —CH$_2$CH$_2$— | " |
| " | " | " | —CH$_2$CH$_2$CONHC$_2$H$_4$— | " |
| " | " | " | —CH$_2$CH$_2$NHCOCH$_2$— | " |
| " | " | " | —CH$_2$CH$_2$NHSO$_2$CH$_2$CH$_2$— | " |
| " | 3-NHCOC$_6$H$_5$ | " | —CH$_2$CH$_2$— | " |
| " | 3-NHCOOC$_2$H$_5$ | " | " | " |
| 6-CH$_3$ | 3-CH$_3$ | —CH$_2$CH$_2$OSO$_3$Na | " | Na$^+$ |
| None | " | —C$_2$H$_5$ | —CH$_2$CH(OSO$_3$Na)CH$_2$— | " |

TABLE 5

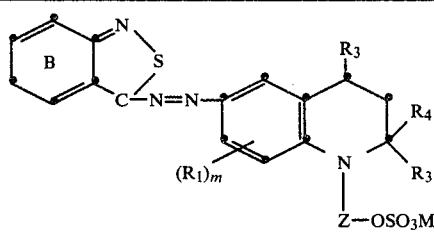

| Substituents on Ring B | $(R_1)_m$ | $R_3$ | $R_4$ | Z | M |
|---|---|---|---|---|---|
| 6-CH$_3$ | None | CH$_3$ | CH$_3$ | —CH$_2$CH$_2$— | K$^+$ |
| " | " | H | CH$_3$ | " | " |
| " | 7-CH$_3$ | " | " | " | " |
| " | " | CH$_3$ | " | " | " |
| " | 7-CH$_3$ | H | CH(CH$_3$)$_2$ | " | " |
| None | 7-OCH$_3$ | " | CH$_3$ | " | " |
| " | 5-OCH$_3$, 8-CH$_3$ | " | " | " | " |
| " | 5,8-di-OCH$_3$ | " | " | " | " |
| " | 5,8-di-CH$_3$ | " | " | " | " |
| " | 7-Cl | " | " | " | " |
| " | 5,8-di-Cl | " | " | " | " |
| " | None | " | " | " | Na$^+$ |
| " | 5-OCH$_3$, 8-CH$_3$ | CH$_3$ | " | " | " |

TABLE 5-continued

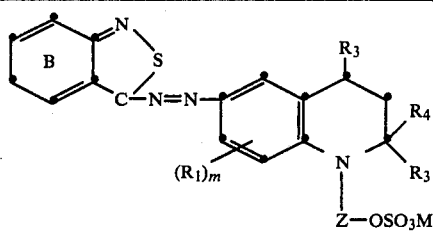

| Substituents on Ring B | $(R_1)_m$ | $R_3$ | $R_4$ | Z | M |
|---|---|---|---|---|---|
| " | 7-NHCHO | " | " | " | " |
| " | 7-NHCOCH$_3$ | " | " | " | " |
| " | 7-NHCOCH$_2$OCH$_3$ | " | " | " | " |
| " | 7-NHCOOC$_2$H$_5$ | " | " | " | " |
| " | 7-NHCOC$_6$H$_5$ | " | " | " | " |
| " | 7-NHCONHC$_2$H$_5$ | " | " | " | K$^+$ |
| " | 7-NHCOC$_6$H$_{11}$ | " | " | " | " |
| 5-Cl | None | " | " | " | " |
| " | 7-CH$_3$ | H | " | " | " |
| " | " | " | H | " | " |
| " | " | " | CH$_3$ | " | " |
| 5-Br | " | " | " | " | " |
| 6-SO$_2$NH$_2$ | " | " | " | " | " |
| 6-SO$_2$NHC$_2$H$_5$ | " | " | " | " | " |
| 6-SO$_2$N(CH$_3$)$_2$ | " | " | " | " | " |
| 6-SO$_2$N(CH$_3$C$_2$H$_4$OH) | 7-OCH$_3$ | " | " | " | " |
| 6-SO$_2$NHC$_3$H$_6$OCH$_3$ | 7-CH$_3$ | " | " | " | " |
| 6-OCH$_3$ | " | " | " | " | " |
| " | " | " | " | " | " |
| " | " | " | " | " | " |
| 5-Cl | " | " | " | " | " |
| " | " | " | " | " | " |
| " | None | " | " | " | " |
| " | " | " | " | " | " |
| " | " | " | " | " | " |
| " | " | " | " | " | " |
| " | 7-CH$_3$ | " | " | " | " |
| " | " | " | " | " | " |
| None | " | " | " | —CH$_2$CH$_2$OCH$_2$CH$_2$— | " |
| " | " | " | " | —CH$_2$CH$_2$SCH$_2$CH$_2$— | " |
| " | " | " | " | —CH$_2$CH$_2$SO$_2$CH$_2$CH$_2$— | " |
| " | " | " | " | —CH$_2$CH$_2$N(SO$_2$CH$_3$)CH$_2$CH$_2$— | " |
| " | " | " | " | —CH$_2$CH$_2$SO$_2$NHCH$_2$CH$_2$— | " |
| " | " | " | " | —CH$_2$CH$_2$CH$_2$NHCOCH$_2$— | " |
| " | " | " | " | —CH$_2$CH$_2$CONHCH$_2$CH$_2$— | " |
| " | " | " | " | —CH$_2$CH$_2$N(COC$_6$H$_5$)CH$_2$CH$_2$— | " |
| " | " | " | " | —CH$_2$CH$_2$(CH$_3$)— | " |
| " | " | " | " | —CH$_2$CH(OSO$_3$Na)CH$_2$— | Na$^+$ |
| " | " | " | " | —CH$_2$CH(CH$_2$Cl)— | " |
| " | " | " | " | —CH$_2$CH(CH$_2$OCH$_3$)— | " |
| " | " | " | " | —CH$_2$CH(C$_6$H$_5$)— | " |
| " | " | " | " | —CH$_2$CH(CH$_2$OC$_6$H$_5$)— | " |
| " | " | " | " | —CH$_2$CH$_2$CH$_2$N(CH$_3$)SO$_2$CH$_2$CH$_2$— | " |
| " | " | " | " | —CH$_2$CH$_2$CH$_2$— | " |

TABLE 6

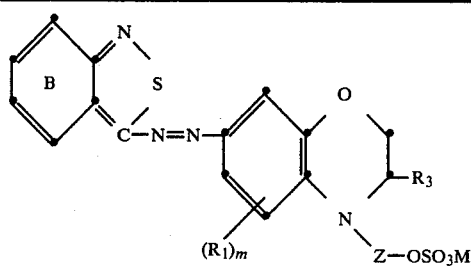

| Substituents on Ring B | $(R_1)_m$ | $R_3$ | Z | M |
|---|---|---|---|---|
| None | None | H | —CH$_2$CH$_2$— | Na$^+$ |
| " | 6-CH$_3$ | " | " | " |
| 6-CH$_3$ | " | 3-CH$_3$ | " | " |
| " | 6-OCH$_3$ | " | " | " |
| None | " | H | " | " |
| " | 6-CH$_3$ | 3-CH$_3$ | —CH$_2$CH$_2$CH$_2$CH$_2$— | " |

TABLE 6-continued

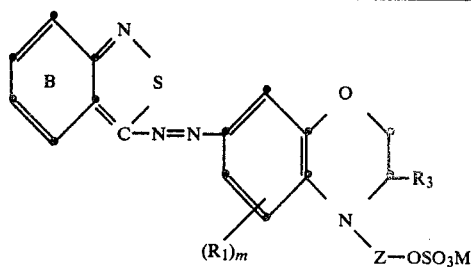

| Substituents on Ring B | $(R_1)_m$ | $R_3$ | Z | M |
|---|---|---|---|---|
| " | " | " | —CH₂CH₂— | " |
| " | " | " | " | " |
| " | " | " | " | " |
| " | " | " | " | " |
| " | " | " | " | " |
| " | " | " | " | " |
| " | 6-NHCOCH₃ | " | " | K⁺ |
| " | 6-NHCOC₆H₅ | " | " | " |
| " | 6-NHCOC₄H₉-n | " | " | " |
| " | 6-NHCONHC₂H₅ | " | " | " |
| 5-Br | 6-NHCOCH₂OCH₃ | " | " | " |
| 6-OCH₃ | 6-NHCOCH₂CN | " | " | " |
| 6-SO₂NH₂ | 6-CH₃ | " | " | Na⁺ |
| 6-SO₂NHC₄H₉-n | " | " | " | " |
| 6-SO₂NHC₃H₆OCH₃ | " | " | " | " |
| 6-SO₂N(C₂H₅)₂ | " | " | " | " |
| 6-SO₂N(C₂H₄OH)₂ | " | " | " | " |
| 6-SO₂NHC₆H₁₁ | " | " | " | " |
| 6-SO₂N(CH₃)C₂H₄OH | " | " | " | " |
| 5-Cl | " | " | " | " |
| " | " | " | " | " |
| " | 6-NHCHO | " | " | " |
| " | 6-CH₃ | " | " | " |
| " | " | " | " | " |
| " | " | " | " | " |
| " | " | " | " | " |
| " | " | " | " | " |
| None | " | " | " | " |
| " | " | " | " | " |
| " | " | " | —CH₂CH(CH₃)— | " |
| " | " | " | —CH₂CH(C₆H₅)— | " |
| " | " | " | —CH₂CH(CH₂Cl)— | " |
| " | " | " | —CH₂CH(OSO₃K)CH₂— | " |
| " | " | " | —CH₂CH(CH₂OC₆H₅)— | " |
| " | " | " | —CH₂CH₂OCH₂CH₂— | " |
| " | " | " | —CH₂CH₂SCH₂CH₂— | " |
| " | " | " | —CH₂CH₂SO₂CH₂CH₂— | " |
| " | " | " | —CH₂CH₂N(SO₂CH₃)CH₂CH₂— | " |
| " | " | " | —CH₂CH₂N(SO₂C₆H₅)CH₂CH₂— | " |
| " | " | " | —CH₂CH₂SO₂N(CH₃)CH₂CH₂— | " |
| " | " | " | —CH₂CH₂NHCOCH₂— | " |
| " | " | " | —CH₂CH₂CH₂NHSO₂CH₂CH₂— | " |
| " | " | " | —CH₂CH₂CONHCH₂CH₂— | " |
| " | " | " | —CH₂CH₂CONHCH₂CH₂CH₂— | " |
| " | " | " | —CH₂CH₂SO₂N(C₆H₅)CH₂CH₂— | " |
| " | " | " | —CH₂CH₂NHCONHCH₂CH₂— | " |
| " | " | " | —CH₂CH₂— | " |
| " | " | " | —CH₂CH₂CH₂CH₂—S—CH₂CH₂— | " |

TABLE 7

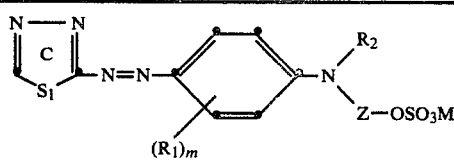

| Substituents on Ring C | $(R_1)_m$ | $R_2$ | Z | M |
|---|---|---|---|---|
| 5-CH₃ | None | C₂H₅ | —CH₂CH₂— | K⁺ |
| 5-CH₂CH₃ | " | C₆H₁₁ | " | " |

TABLE 7-continued

Structure: Triazole-thiazole ring C connected via N=N azo link to a benzene ring bearing (R₁)ₘ, with N(R₂)(Z—OSO₃M) substituent.

| Substituents on Ring C | (R₁)ₘ | R₂ | Z | M |
|---|---|---|---|---|
| 5-CH₂CH(CH₃) | " | C₆H₅ | " | " |
| 5-C₆H₅ | 3-CH₃ | C₂H₅ | " | " |
| 5-C₆H₁₁ | " | CH₂C₆H₅ | " | " |
| 5-C₆H₄-p-Cl | " | CH₂CH₂OCH₃ | —CH₂CH₂CH₂CH₂— | " |
| 5-C₆H₄—O—CH₃ | " | CH₂CH₂CONH₂ | —CH₂CH₂— | " |
| 5-C₆H₄-m-OCH₃ | " | CH₂CH₂Cl | " | " |
| 5-SCH₃ | 3-NHCOCH₃ | C₂H₅ | " | " |
| " | 2-CH₃-5-NHCOCH₃ | H | " | " |
| " | 2-OCH₃-5-CH₃ | " | " | " |
| " | 2-Cl | " | " | " |
| " | 2-CH₃ | " | " | " |
| " | 2,5-di-Cl | " | " | " |
| " | 2-OCH₃-5-Cl | " | " | " |
| " | 2-OCH₃-5-CH₃ | " | " | " |
| 5-OC₂H₅ | 2,5-di-CH₃ | " | " | Na⁺ |
| 5-SC₂H₅ | 3-CH₃ | " | " | " |
| " | 3-CH₃ | CH₂CH₂N(COCH₂-CH₂-O-CH₂)(COCH₂) (morpholine-type) | —CH₂CH(CH₂Cl)— | " |
| " | 3-CH₃ | CH₂CH₂N(CO-C₆H₄-CO) (phthalimide) | —CH₂CH₂— | NH₄⁺ |
| " | 3-CH₃ | CH₂CH₂N(CO—CH₂)(CH₂CH₂) | " | K⁺ |
| " | 3-CH₃ | CH₂CH₂NHSO₂CH₃ | " | " |
| " | 3-CH₃ | CH₂CH₂CH₂NHCOCH₃ | " | " |
| " | None | CH₃ | —CH₂CH₂— | " |
| 5-Cl | 3-CH₃ | CH₂CH(CH₃)₂ | —CH₂CH₂OCH₂CH₂— | " |
| 5-SO₂CH₃ | " | CH₂C₆H₁₁ | —CH₂CH₂— | " |
| 5-OC₄H₉-n | " | CH₂CH₂OC₆H₅ | " | " |
| 5-SCH₂CH₂OH | " | CH(CH₃)₂ | " | " |
| 5-SCH₂COOCH₃ | H | —CH₂CH₃ | " | K⁺ |
| 5-S—CH₂CH₂OCCH₃ (O) | " | CH₂CH₂OCH₂CH₂OC₂H₅ | " | " |
| 5-SCH₂SC₆H₅ | 3-CH₃ | —CH₂CH₃ | " | " |
| 5-SO₂CH₃ | " | " | " | " |
| 5-SO₂NH₂ | " | " | " | " |
| 5-SO₂NHC₂H₅ | " | " | " | " |
| 5-SCN | 3-NHCOC₆H₅ | " | " | " |
| 5-SO₂N(CH₃)₂ | 3-NHCONC₂H₅ | " | " | " |
| 5-SO₃(C₆H₅) | 3-NHCOCH₂OCH₃ | " | " | " |
| 5-SCH₃CH=CH₂ | 3-NHCOC₆H₁₁ | " | " | " |
| 5-SCH₂CH₂OCH₃ | 3-NHCOOC₂H₅ | " | CH₂CH(CH₃)— | " |
| 5-SCH₂CH₂N(COCH₂)(COCH₂) | 3-NHCOCH₂CN | " | CH₂CH(CH₂OCH₃)— | " |
| 5-SC₆H₁₁ | " | " | —CH₂CH₂— | " |
| 5-SC₆H₅ | None | " | " | " |
| 5-SO₂C₆H₅ | " | " | " | " |
| 5-I | 3-CH₃ | " | —CH₂CH₂SCH₂CH₂— | " |
| 5-Br | " | " | —CH₂CH₂SO₂CH₂CH₂CH₂CH₂— | " |
| 5-SCH₂CH₂N(CO—CH₂)(CH₂CH₂) | " | " | —CH₂CH₂N(SO₂CH₃)CH₂CH₂— | " |
| 5-SCH₂CH₂NHSO₂CH₃ | " | " | —CH₂CH₂N(COCH₃)CH₂CH₂— | " |
| 5-SCH₂CH₂NHCOCH₃ | " | " | —CH₂CH₂SO₂NHCH₂CH₂— | " |
| 5-SCH₂CH₂OC₆H₅ | " | " | —CH₂CH₂— | " |
| 5-SCH₂CH₂C₆H₅ | " | " | " | " |
| 5-SCH₂CH₂OC₂H₅ | " | " | —CH₂CH₂CONHC₂H₄— | " |

TABLE 7-continued

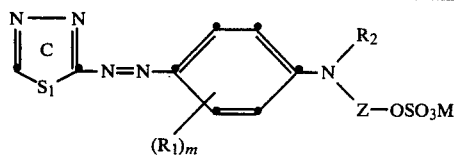

| Substituents on Ring C | $(R_1)_m$ | $R_2$ | Z | M |
|---|---|---|---|---|
| 5-SO$_2$C$_6$H$_{11}$ | " | " | —CH$_2$CH$_2$NHCOCH$_2$— | " |
| 5-CH$_3$ | " | " | —CH$_2$CH$_2$NHSO$_2$CH$_2$CH$_2$— | " |
| " | 3-NHCOC$_6$H$_5$ | " | —CH$_2$CH$_2$— | " |
| " | 3-NHCOOC$_2$H$_5$ | " | " | " |
| 5-NHCOCH$_3$ | 3-CH$_3$ | —CH$_2$CH$_2$OSO$_3$Na | " | Na$^+$ |
| " | " | —C$_2$H$_5$ | —CH$_2$CH(OSO$_3$Na)CH$_2$— | " |

TABLE 8

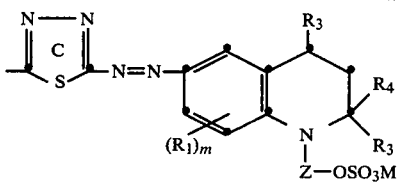

| Substituents on Ring C | $(R_1)_m$ | $R_3$ | $R_4$ | Z | M |
|---|---|---|---|---|---|
| None | None | CH$_3$ | CH$_3$ | —CH$_2$CH$_2$— | K$^+$ |
| " | " | H | CH$_3$ | " | " |
| " | 7-CH$_3$ | " | " | " | " |
| 5-CH$_3$ | " | CH$_3$ | " | " | " |
| 5-CH$_2$CH$_3$ | 7-CH$_3$ | H | CH(CH$_3$)$_2$ | " | " |
| 5-CH(CH$_3$)$_2$ | 7-OCH$_3$ | " | CH$_3$ | " | " |
| 5-CH$_2$CH(CH$_3$)$_2$ | 5-OCH$_3$, 8-CH$_3$ | " | " | " | " |
| 5-C$_6$H$_5$ | 5,8-di-OCH$_3$ | " | " | " | " |
| 5-C$_6$H$_{11}$ | 5,8-di-CH$_3$ | " | " | " | " |
| 5-C$_6$H$_4$-o-Cl | 7-Cl | " | " | " | " |
| 5-C$_6$H$_4$-m-CH$_3$ | 5,8-di-Cl | " | " | " | " |
| 5-C$_6$H$_4$-p-OCH$_3$ | None | " | " | " | Na$^+$ |
| 5-OC$_2$H$_5$ | 5-OCH$_3$, 8-CH$_3$ | CH$_3$ | " | " | " |
| " | 7-NHCHO | " | " | " | " |
| " | 7-NHCOCH$_3$ | " | " | " | " |
| " | 7-NHCOCH$_2$OCH$_3$ | " | " | " | " |
| " | 7-NHCOOC$_2$H$_5$ | " | " | " | " |
| " | 7-NHCOC$_6$H$_5$ | " | " | " | " |
| " | 7-NHCONHC$_2$H$_5$ | " | " | " | K$^+$ |
| 5-Cl | 7-NHCOC$_6$H$_{11}$ | " | " | " | " |
| " | None | " | " | " | " |
| " | 7-CH$_3$ | H | " | " | " |
| " | " | " | H | " | " |
| 5-I | " | " | CH$_3$ | " | " |
| 5-Br | " | " | " | " | " |
| 5-SO$_2$CH$_3$ | " | " | " | " | " |
| 5-SO$_2$NH$_2$ | " | " | " | " | " |
| 5-SO$_2$N(CH$_3$)$_2$ | " | " | " | " | " |
| 5-SO$_2$N(C$_2$H$_5$)$_2$ | 7-OCH$_3$ | " | " | " | " |
| 5-SO$_2$NHC$_3$H$_6$OCH$_3$ | 7-CH$_3$ | " | " | " | " |
| 5-SO$_2$CH$_2$CH$_2$OC$_2$H$_5$ | " | " | " | " | " |
| 5-SC$_6$H$_5$ | " | " | " | " | " |
| 5-SC$_6$H$_{11}$ | " | " | " | " | " |
| 5-SO$_2$C$_6$H$_5$ | " | " | " | " | " |
| 5-SO$_3$C$_6$H$_5$ | " | " | " | " | " |
| 5-SCH$_2$CH$_2$OH | None | " | " | " | " |
| 5-SCH$_2$CH=CH$_2$ | " | " | " | " | " |
| 5-SCH$_2$COOC$_2$H$_5$ | " | " | " | " | " |
| 5-SCH$_2$C$_6$H$_5$ | " | " | " | " | " |
| 5-SCH$_2$C$_6$H$_{11}$ | 7-CH$_3$ | " | " | " | " |
| 5-SCH$_2$CH$_2$OC$_2$H$_5$ | " | " | " | " | " |
| 5-SCN | " | " | " | —CH$_2$CH$_2$OCH$_2$CH$_2$— | " |
| 5-SCH$_2$CH$_2$NHCOCH$_3$ | " | " | " | —CH$_2$CH$_2$SCH$_2$CH$_2$— | " |
| 5-SCH$_2$CH$_2$N(COCH$_2$/COCH$_2$) | " | " | " | —CH$_2$CH$_2$SO$_2$CH$_2$CH$_2$— | " |
| 5-SCH$_2$CH$_2$OC$_6$H$_5$ | " | " | " | —CH$_2$CH$_2$N(SO$_2$CH$_3$)CH$_2$CH$_2$— | " |
| 5-SCH$_2$CH$_3$ | " | " | " | —CH$_2$CH$_2$SO$_2$NHCH$_2$CH$_2$— | " |
| " | " | " | " | —CH$_2$CH$_2$CH$_2$NHCOCH$_2$— | " |

TABLE 8-continued

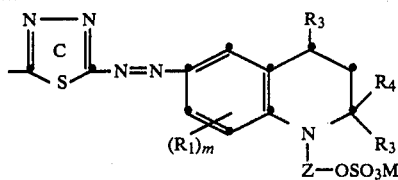

| Substituents on Ring C | (R₁)ₘ | R₃ | R₄ | Z | M |
|---|---|---|---|---|---|
| " | " | " | " | —CH₂CH₂CONHCH₂CH₂— | " |
| " | " | " | " | —CH₂CH₂N(COC₆H₅)CH₂CH₂— | " |
| " | " | " | " | —CH₂CH₂(CH₃)— | " |
| " | " | " | " | —CH₂CH(OSO₃Na)CH₂— | Na⁺ |
| " | " | " | " | —CH₂CH(CH₂Cl)— | " |
| 5-SCH₃ | " | " | " | —CH₂CH(CH₂OCH₃)— | " |
| " | " | " | " | —CH₂CH(C₆H₅)— | " |
| " | " | " | " | —CH₂CH(CH₂OC₆H₅)— | " |
| " | " | " | " | —CH₂CH₂CH₂N(CH₃)SO₂CH₂CH₂— | " |
| 5-NHCOCH₃ | " | " | " | —CH₂CH₂CH₂— | " |

TABLE 9

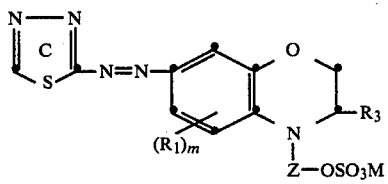

| Substituents on Ring C | (R₁)m | R₃ | Z | M |
|---|---|---|---|---|
| None | None | H | —CH₂CH₂— | Na⁺ |
| " | 6-CH₃ | " | " | " |
| " | " | 3-CH₃ | " | " |
| 5-CH₃ | 6-OCH₃ | " | " | " |
| 5-CH(CH₃)₂ | " | H | " | " |
| 5-CH₂CH(CH₃)₂ | 6-CH₃ | 3-CH₃ | —CH₂CH₂CH₂CH₂— | " |
| 5-C₆H₅ | " | " | —CH₂CH₂— | " |
| 5-C₆H₄-p-Cl | " | " | " | " |
| 5-C₆H₄-p-OCH₃ | " | " | " | " |
| 5-C₆H₄-m-CH₃ | " | " | " | " |
| 5-OC₂H₅ | " | " | " | " |
| 5-OCH(CH₃)₂ | " | " | " | " |
| 5-C₆H₁₁ | " | " | " | " |
| 5-SCN | " | " | " | " |
| 5-SCH₃ | 6-NHCOCH₃ | " | " | K⁺ |
| 5-SCH₂CH(CH₃)₂ | 6-NHCOC₆H₅ | " | " | " |
| 5-SCH₂CH=CH₂ | 6-NHCOC₄H₉-n | " | " | " |
| 5-SC₆H₁₁ | 6-NHCONHC₂H₅ | " | " | " |
| 5-SC₆H₅ | 6-NHCOCH₂OCH₃ | " | " | " |
| 5-SCH₂C₆H₅ | 6-NHCOCH₂CN | " | " | " |
| 5-SCH₂CH₂OC₆H₅ | 6-CH₃ | " | " | Na⁺ |
| 5-SCH₂CH₂OC₂H₅ | " | " | " | " |
| 5-SCH₂CH₂OH | " | " | " | " |
| 5-SCH₂CH₂Cl | " | " | " | " |
| 5-SCH₂COOC₂H₅ | " | " | " | " |
| 5-SCH₂CH₂OCOCH₃ | " | " | " | " |
| 5-SCH₂C₆H₁₁ | " | " | " | " |
| 5-SO₂CH₃ | " | " | " | " |
| 5-SO₂C₄H₉-n | " | " | " | " |
| 5-SO₂CH₂CH₂OCH₃ | 6-NHCHO | " | " | " |
| 5-SO₂C₆H₅ | 6-CH₃ | " | " | " |
| 5-SO₂C₆H₁₁ | " | " | " | " |
| 5-SO₂CH₂C₆H₅ | " | " | " | " |
| 5-SO₂CH₂CH₂OH | " | " | " | " |
| 5-SCH₂CH₂N(COCH₂)(COCH₂) | " | " | " | " |
| 5-SCH₂CH₂NHCOCH₃ | " | " | " | " |
| 5-SCH₂CH₂N(COCH₂)(COCH₂) | " | " | " | " |
| 5-SO₂NH₂ | " | " | " | " |

TABLE 9-continued

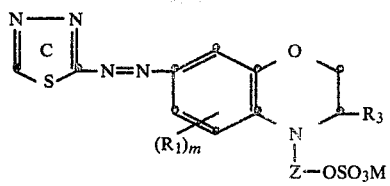

| Substituents on Ring C | (R₁)m | R₃ | Z | M |
|---|---|---|---|---|
| 5-SO₂NHC₃H₆OCH₃ | " | " | —CH₂CH(CH₃)— | " |
| 5-SO₂N(CH₃)₂ | " | " | —CH₂CH(C₆H₅)— | " |
| 5-SO₂NHC₂H₅ | " | " | —CH₂CH(CH₂Cl)— | " |
| 5-SO₂NHC₆H₁₁ | " | " | —CH₂CH(OSO₃K)CH₂— | " |
| 5-SO₃C₆H₅ | " | " | —CH₂CH(CH₂OC₆H₅)— | " |
| 5-SO₂NHC₆H₅ | " | " | —CH₂CH₂OCH₂CH₂— | " |
| 5-NHCOCH₃ | " | " | —CH₂CH₂SCH₂CH₂— | " |
| 5-SC₂H₅ | " | " | —CH₂CH₂SO₂CH₂CH₂— | " |
| " | " | " | —CH₂CH₂N(SO₂CH₃)CH₂CH₂— | " |
| " | " | " | —CH₂CH₂N(SO₂C₆H₅)CH₂CH₂— | " |
| " | " | " | —CH₂CH₂SO₂N(CH₃)CH₂CH₂— | " |
| " | " | " | —CH₂CH₂NHCOCH₂— | " |
| " | " | " | —CH₂CH₂CH₂NHSO₂CH₂CH₂— | " |
| " | " | " | —CH₂CH₂CONHCH₂CH₂— | " |
| " | " | " | —CH₂CH₂CONHCH₂CH₂CH₂CH₂— | " |
| " | " | " | —CH₂CH₂SO₂N(C₆H₅)CH₂CH₂— | " |
| " | " | " | —CH₂CH₂NHCONHCH₂CH₂— | " |
| " | " | " | —CH₂CH₂— | " |
| " | " | " | —CH₂CH₂CH₂CH₂—S—CH₂CH₂— | " |

TABLE 10

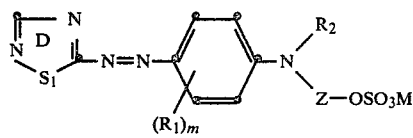

| Substituents on Ring D | (R₁)m | R₂ | Z | M |
|---|---|---|---|---|
| 3-CH₃ | None | C₂H₅ | —CH₂CH₂— | K⁺ |
| " | " | C₆H₁₁ | " | " |
| " | " | C₆H₅ | " | " |
| " | 3CH₃ | C₂H₅ | " | " |
| " | " | CH₂C₆H₅ | " | " |
| " | " | CH₂CH₂OCH₃ | —CH₂CH₂CH₂CH₂— | " |
| " | " | CH₂CH₂CONH₂ | —CH₂CH₂— | " |
| 3-SCH₃ | " | CH₂CH₂Cl | " | " |
| 3-C₆H₅ | 3-NHCOCH₃ | C₂H₅ | " | " |
| 3-C₆H₄—p-Cl | 2-CH₃—5-NHCOCH₃ | H | " | " |
| 3-C₆H₄—o-CN | 2-OCH₃—5-CH₃ | " | " | " |
| " | 2-Cl | " | " | " |
| " | 2-CH₃ | " | " | " |
| " | 2,5-di-Cl | " | " | " |
| " | 2-OCH₃—5-Cl | " | " | " |
| " | 2-OCH₃—5-CH₃ | " | " | " |
| " | 2,5-di-CH₃ | " | " | " |
| 3-C₆H₅ | 3-CH₃ | CH₂—CH—CH₂ (epoxide) | " | " |
| " | 3-CH₃ | CH₂CH₂N(COCH₂)₂ (succinimide) | —CH₂CH(CH₂Cl)— | " |
| " | 3-CH₃ | CH₂CH₂N(CO)₂C₆H₄ (phthalimide) | —CH₂CH₂— | NH₄⁺ |
| " | 3-CH₃ | CH₂CH₂N(CO—CH₂)(CH₂CH₂) | " | K⁺ |
| " | 3-CH₃ | CH₂CH₂NHSO₂CH₃ | " | " |
| 3-C₆H₄—p-CH₂ | 3-CH₃ | CH₂CH₂CH₂NHCOCH₃ | " | " |
| 3-C₆H₅ | None | CH₃ | —CH₂CH₂— | " |
| " | 3-CH₃ | CH₂CH(CH₃)₂ | —CH₂CH₂OCH₂CH₂— | " |
| " | " | CH₂C₆H₁₁ | —CH₂CH₂— | " |

TABLE 10-continued

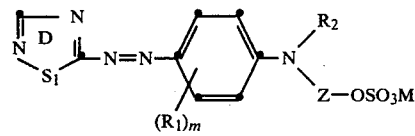

| Substituents on Ring D | (R₁)m | R₂ | Z | M |
|---|---|---|---|---|
| " | " | CH₂CH₂OC₆H₅ | " | " |
| " | " | CH(CH₃)₂ | " | " |
| " | H | —CH₂CH₃ | " | K⁺ |
| " | " | CH₂CH₂OCH₂CH₂OC₂H₅ | " | " |
| 3-SO₂CH₃ | 3-CH₃ | —CH₂CH₃ | " | " |
| 3-SCH₂CH₂COOCH₃ | " | " | " | " |
| 3-SCH₂C₆H₅ | " | " | " | " |
| 3-SCH₂CH₂OCH₃ | " | " | " | " |
| 3-SC₆H₁₁ | 3-NHCOC₆H₅ | " | " | " |
| 3-SC₂H₅ | 3-NHCONHC₂H₅ | " | " | " |
| " | 3-NHCOCH₂OCH₃ | " | " | " |
| " | 3-NHCOC₆H₁₁ | " | " | " |
| " | 3-NHCOOC₂H₅ | " | CH₂CH(CH₃)— | " |
| " | 3-NHCOCH₂CN | " | CH₂CH(CH₂OCH₃)— | " |
| 3-SCH₂COOCH₃ | " | " | —CH₂CH₂— | " |
| " | None | " | " | " |
| " | " | " | " | " |
| " | 3-CH₃ | " | —CH₂CH₂SCH₂CH₂— | " |
| 3-SCH₃ | " | " | —CH₂CH₂SO₂CH₂CH₂CH₂CH₂— | " |
| " | " | " | —CH₂CH₂N(SO₂CH₃)CH₂CH₂— | " |
| " | " | " | —CH₂CH₂N(COCH₃)CH₂CH₂— | " |
| " | " | " | —CH₂CH₂SO₂NHCH₂CH₂— | " |
| 3-SCH₂CH(CH₃)₂ | " | " | —CH₂CH₂— | " |
| " | " | " |  | " |
| " | " | " | —CH₂CH₂CONHC₂H₄— | " |
| " | " | " | —CH₂CH₂NHCOCH₂— | " |
| " | " | " | —CH₂CH₂NHSO₂CH₂CH₂— | " |
| " | 3-NHCOC₆H₅ | " | —CH₂CH₂— | " |
| " | 3-NHCOOC₂H₅ | " | " | " |
| " | 3-CH₃ | —CH₂CH₂OSO₃Na | " | Na⁺ |
| " | " | —C₂H₅ | —CH₂CH(OSO₃Na)CH₂— | " |

TABLE 11

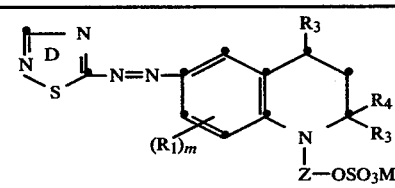

| Substituents on Ring D | (R₁)m | R₃ | R₄ | Z | M |
|---|---|---|---|---|---|
| 3-CH₃ | None | CH₃ | CH₃ | —CH₂CH₂— | K⁺ |
| " | " | H | CH₃ | " | " |
| " | 7-CH₃ | " | " | " | " |
| " | " | CH₃ | " | " | " |
| " | 7-CH₃ | H | CH(CH₃)₂ | " | " |
| " | 7-OCH₃ | " | CH₃ | " | " |
| " | 5-OCH₃, 8-CH₃ | " | " | " | " |
| " | 5,8-di-OCH₃ | " | " | " | " |
| " | 5,8-di-CH₃ | " | " | " | " |
| " | 7-Cl | " | " | " | " |
| 3-SCH₃ | 5,8-di-Cl | " | " | " | " |
| 3-C₆H₅ | None | " | " | " | Na⁺ |
| " | 5-OCH₃, 8-CH₃ | CH₃ | " | " | " |
| " | 7-NHCHO | " | " | " | " |
| " | 7-NHCOCH₃ | " | " | " | " |
| " | 7-NHCOCH₂OCH₃ | " | " | " | " |
| " | 7-NHCOOC₂H₅ | " | " | " | " |
| " | 7-NHCOC₆H₅ | " | " | " | " |
| " | 7-NHCONHC₂H₅ | " | " | " | K⁺ |
| " | 7-NHCOC₆H₁₁ | " | " | " | " |
| " | None | " | " | " | " |
| " | 7-CH₃ | H | " | " | " |
| C₆H₄—o-CN | " | " | H | " | " |
| " | " | " | CH₃ | " | " |
| " | " | " | " | " | " |
| 3-C₆H₄—p-CH₃ | " | " | " | " | " |

TABLE 11-continued

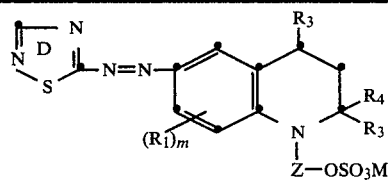

| Substituents on Ring D | $(R_1)_m$ | $R_3$ | $R_4$ | Z | M |
|---|---|---|---|---|---|
| 3-C$_6$H$_4$—o-Cl | " | " | " | " | " |
| 3-SO$_2$CH$_3$ | 7-OCH$_3$ | " | " | " | " |
| 3-SC$_6$H$_{11}$ | 7-CH$_3$ | " | " | " | " |
| 3-SCH$_2$CH$_2$OCH$_3$ | " | " | " | " | " |
| 3-SCH$_2$CH$_2$COOCH$_3$ | " | " | " | " | " |
| 3-SCH$_2$C$_6$H$_5$ | " | " | " | " | " |
| 3-CH$_2$CH$_3$ | " | " | " | " | " |
| 3-SCH$_2$COOCH$_3$ | " | " | " | " | " |
| 3-SCH$_2$CH$_2$COOC$_2$H$_5$ | None | " | " | " | " |
| 3-SCH$_2$CH$_2$COOCH(CH$_3$)$_2$ | " | " | " | " | " |
| 3-SO$_2$C$_4$H$_9$-n | " | " | " | " | " |
| 3-SCH$_2$CH$_2$CONHC$_4$H$_9$-n | " | " | " | " | " |
| 3-SCH$_3$ | 7-CH$_3$ | " | " | " | " |
| " | " | " | " | " | " |
| 3-SC$_2$H$_5$ | " | " | " | —CH$_2$CH$_2$OCH$_2$CH$_2$— | " |
| " | " | " | " | —CH$_2$CH$_2$SCH$_2$CH$_2$— | " |
| " | " | " | " | —CH$_2$CH$_2$SO$_2$CH$_2$CH$_2$— | " |
| " | " | " | " | —CH$_2$CH$_2$N(SO$_2$CH$_3$)CH$_2$CH$_2$— | " |
| " | " | " | " | —CH$_2$CH$_2$SO$_2$NHCH$_2$CH$_2$— | " |
| " | " | " | " | —CH$_2$CH$_2$CH$_2$NHCOCH$_2$ | " |
| " | " | " | " | —CH$_2$CH$_2$CONHCH$_2$CH$_2$— | " |
| " | " | " | " | —CH$_2$CH$_2$N(COC$_6$H$_5$)CH$_2$CH$_2$— | " |
| " | " | " | " | —CH$_2$CH(CH$_3$)— | " |
| " | " | " | " | —CH$_2$CH(OSO$_3$Na)CH$_2$— | Na$^+$ |
| " | " | " | " | —CH$_2$CH(CH$_2$Cl)— | " |
| " | " | " | " | —CH$_2$CH(CH$_2$OCH$_3$)— | " |
| " | " | " | " | —CH$_2$CH(C$_6$H$_5$)— | " |
| " | " | " | " | —CH$_2$CH(CH$_2$OC$_6$H$_5$)— | " |
| " | " | " | " | —CH$_2$CH$_2$CH$_2$N(CH$_3$)SO$_2$CH$_2$CH$_2$— | " |
| " | " | " | " | —CH$_2$CH$_2$CH$_2$— | " |

TABLE 12

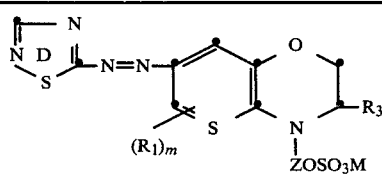

| Substituents on Ring D | $(R_1)m$ | $R_3$ | Z | M |
|---|---|---|---|---|
| 3-CH$_3$ | None | H | —CH$_2$CH$_2$— | Na$^+$ |
| " | 6-CH$_3$ | " | " | " |
| " | " | 3-CH$_3$ | " | " |
| " | 6-OCH$_3$ | " | " | " |
| " | " | H | " | " |
| " | 6-CH$_3$ | 3-CH$_3$ | —CH$_2$CH$_2$CH$_2$CH$_2$— | " |
| 3-SCH$_3$ | " | " | —CH$_2$CH$_2$— | " |
| 3-CH$_2$CH$_3$ | " | " | " | " |
| 3-SCH$_2$CH$_2$OCH$_3$ | " | " | " | " |
| 3-SCH$_2$CH$_2$OC$_2$H$_5$ | " | " | " | " |
| 3-SCH$_2$CH$_2$COOCH$_3$ | " | " | " | " |
| 3-SCH$_2$COOCH$_2$CH$_3$ | " | " | " | " |
| 3-SCH$_2$C$_6$H$_5$ | " | " | " | " |
| 3-SC$_6$H$_{11}$ | " | " | " | " |
| 3-SCH$_3$ | 6-NHCOCH$_3$ | " | " | K$^+$ |
| " | 6-NHCOC$_6$H$_5$ | " | " | " |
| " | 6-NHCOC$_4$H$_9$—n | " | " | " |
| " | 6-NHCONHC$_2$H$_5$ | " | " | " |
| " | 6-NHCOCH$_2$OCH$_3$ | " | " | " |
| " | 6-NHCOCH$_2$CN | " | " | " |
| 3-SO$_2$CH$_3$ | 6-CH$_3$ | " | " | Na$^+$ |
| 3-SO$_2$C$_4$H$_9$—n | " | " | " | " |
| 3-C$_6$H$_5$ | " | " | " | " |
| 3-C$_6$H$_4$—o-CN | " | " | " | " |
| 3-C$_6$H$_4$—o-Cl | " | " | " | " |
| 3-C$_6$H$_4$—p-CH$_3$ | " | " | " | " |
| 3-C$_6$H$_4$—m-CH$_3$ | " | " | " | " |

TABLE 12-continued

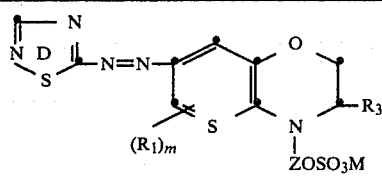

| Substituents on Ring D | (R₁)m | R₃ | Z | M |
|---|---|---|---|---|
| 3-C₆H₄—o-CH₃ | " | " | " | " |
| 3-C₆H₄—o-CONH₂ | " | " | " | " |
| 3-C₆H₄—OCN | 6-NHCHO | " | " | " |
| 3-S—CH₂CH₂OC₆H₅ | 6-CH₃ | " | " | " |
| 3-SO₂C₄H₉-n | " | " | " | " |
| 3-SO₂CH₂CH₂COOCH₃ | " | " | " | " |
| 3-SO₂CH₂COOCH₃ | " | " | " | " |
| 3-SO₂C₆H₁₁ | " | " | " | " |
| 3-SO₂CH₂CH₃ | " | " | " | " |
| 3-SO₂CH₂CH₂OCH₃ | " | " | " | " |
| 3-SCH₂CH₂CONHC₂H₄OH | " | " | " | " |
| 3-SCH₂CH₃ | " | " | —CH₂CH(CH₃)— | " |
| " | " | " | —CH₂CH(C₆H₅)— | " |
| " | " | " | —CH₂CH(CH₂Cl)— | " |
| " | " | " | —CH₂CH(OSO₃K)CH₂— | " |
| " | " | " | —CH₂CH(CH₂OC₆H₅)— | " |
| " | " | " | —CH₂CH₂OCH₂CH₂— | " |
| " | " | " | —CH₂CH₂SCH₂CH₂— | " |
| 3-C₆H₅ | " | " | —CH₂CH₂SO₂CH₂CH₂— | " |
| " | " | " | —CH₂CH₂N(SO₂CH₃)CH₂CH₂— | " |
| " | " | " | —CH₂CH₂N(SO₂C₆H₅)CH₂CH₂— | " |
| " | " | " | —CH₂CH₂SO₂N(CH₃)CH₂CH₂— | " |
| " | " | " | —CH₂CH₂NHCOCH₂— | " |
| " | " | " | —CH₂CH₂CH₂NHSO₂CH₂CH₂— | " |
| " | " | " | —CH₂CH₂CONHCH₂CH₂— | " |
| " | " | " | —CH₂CH₂CONHCH₂CH₂CH₂CH₂— | " |
| " | " | " | —CH₂CH₂SO₂N(C₆H₅)CH₂CH₂— | " |
| " | " | " | —CH₂CH₂NHCONHCH₂CH₂— | " |
| " | " | " | —CH₂CH₂CH₂— | " |
| " | " | " | —CH₂CH₂CH₂CH₂—S—CH₂CH₂— | " |

TABLE 13

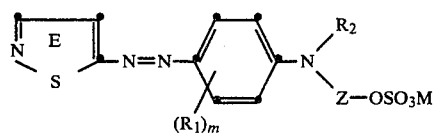

| Substituents on Ring E | (R₁)m | R₂ | Z | M |
|---|---|---|---|---|
| 3-CH₃—4-Br | None | C₂H₅ | —CH₂CH₂— | K⁺ |
| " | " | C₆H₁₁ | " | " |
| " | " | C₆H₅ | " | " |
| " | 3CH₃ | C₂H₅ | " | " |
| " | " | CH₂C₆H₅ | " | " |
| " | " | CH₂CH₂OCH₃ | —CH₂CH₂CH₂CH₂— | " |
| " | " | CH₂CH₂CONH₂ | —CH₂CH₂— | " |
| " | " | CH₂CH₂Cl | " | " |
| " | 3-NHCOCH₃ | C₂H₅ | " | " |
| " | 2-CH₃—5-NHCOCH₃ | H | " | " |
| " | 2-OCH₃—5-3 | " | " | " |
| " | 2-Cl | " | " | " |
| " | 2-CH₃ | " | " | " |
| " | 2,5-di-Cl | " | " | " |
| " | 2-OCH₃-5-Cl | " | " | " |
| 3-CH₃-4-Cl | 2-OCH₃-5-CH₃ | " | " | " |
| " | 2,5-di-CH₃ | " | " | Na⁺ |
| " | 3-CH₃ | CH₂-[oxolane ring] | " | " |
| " | 3-CH₃ | CH₂CH₂N(COCH₂)₂ | —CH₂CH(CH₂Cl)— | " |

TABLE 13-continued

| Substituents on Ring E | (R₁)m | R₂ | Z | M |
|---|---|---|---|---|
| 3-CH₃—4-CN | 3-CH₃ | CH₂CH₂N(CO-C₆H₄-CO) (phthalimide) | —CH₂CH₂— | NH₄⁺ |
| 3-CH₃—4-COOC₂H₅ | 3-CH₃ | CH₂CH₂N(CO-CH₂-CH₂) (succinimide) | " | K⁺ |
| " | 3-CH₃ | CH₂CH₂NHSO₂CH₃ | " | " |
| " | 3-CH₃ | CH₂CH₂CH₂NHCOCH₃ | " | " |
| " | None | CH₃ | —CH₂CH₂— | " |
| 3-CH₃—4-SCH₂CH=CH₂ | 3-CH₃ | CH₂CH(CH₃)₂ | —CH₂CH₂OCH₂CH— | " |
| " | " | CH₂C₆H₁₁ | —CH₂CH₂— | " |
| " | " | CH₂CH₂OC₆H₅ | " | " |
| 3-CH₃—4-SO₂C₂H₅ | " | CH(CH₃)₂ | " | " |
| 3-CH₃—4-SC₆H₁₁ | H | —CH₂CH₃ | " | K⁺ |
| 3-CH₃—4-OC₂H₅ | " | CH₂CH₂OCH₂CH₂OC₂H₅ | " | " |
| 3-Cl—4-CN | 3-CH₃ | —CH₂CH₃ | " | " |
| 3-CH₃—4-SCN | " | " | " | " |
| 3-Br—4-COOCH₃ | " | " | " | " |
| 3-CH₃—4-COOC₂H₅ | " | " | " | " |
| 3-CH₃—4-CONH₂ | 3-NHCOC₆H₅ | " | " | " |
| 3-CH₃—4-CONHC₂H₄OH | 3-NHCONHC₂H₅ | " | " | " |
| 3-CH₃—4-CONHC₄H₉-n | 3-NHCOCH₂OCH₃ | " | " | " |
| 3-CH₃—4-OC₆H₅ | 3-NHCOC₆H₁₁ | " | " | " |
| 3-CH₃—4-OC₆H₄p-CH₃ | 3-NHCOOC₂H₅ | " | CH₂CH(CH₃)— | " |
| 3-CH₃—4-SC₆H₅ | 3-NHCOCH₂CN | " | CH₂CH(CH₂OCH₃)— | " |
| 3-CH₃—4-SCH₂CH₂OH | " | " | —CH₂CH₂— | " |
| 3-CH₃—4-SCH₂CH₃ | None | " | " | " |
| 3-CH₃—4-C(=N-C₆H₄-S-) (benzothiazole) | " | " | " | " |
| 3-CH₃—4-Br | 3-CH₃ | " | —CH₂CH₂SCH₂CH₂— | " |
| " | " | " | —CH₂CH₂SO₂CH₂CH₂CH₂CH₂— | " |
| " | " | " | —CH₂CH₂N(SO₂CH₃)CH₂CH₂— | " |
| " | " | " | —CH₂CH₂N(COCH₃)CH₂CH₂— | " |
| " | " | " | —CH₂CH₂SO₂NHCH₂CH₂— | " |
| 3-CH₃—4-CONH₂ | " | " | —CH₂CH₂— | " |
| 3-CH₃—4-CONHC₃H₆OCH₃ | " | " | " | " |
| 3-CH₃—4-Cl | " | " | —CH₂CH₂CONHC₂H₄— | " |
| " | " | " | —CH₂CH₂NHCOCH₂— | " |
| " | " | " | —CH₂CH₂NHSO₂CH₂CH₂— | " |
| " | 3-NHCOC₆H₅ | " | —CH₂CH₂— | " |
| " | 3-NHCOOC₂H₅ | " | " | " |
| " | 3-CH₃ | —CH₂CH₂OSO₃Na | " | Na⁺ |
| " | " | —C₂H₅ | —CH₂CH(OSO₃Na)CH₂— | " |

TABLE 14

| Substituents on Ring E | (R₁)m | R₃ | R₄ | Z | M |
|---|---|---|---|---|---|
| 3-CH₃—4-Br | None | CH₃ | CH₃ | —CH₂CH₂— | K⁺ |
| " | " | H | CH₃ | " | " |
| " | 7-CH₃ | " | " | " | " |
| " | " | CH₃ | " | " | " |
| " | 7-CH₃ | H | CH(CH₃)₂ | " | " |
| " | 7-OCH₃ | " | CH₃ | " | " |
| " | 5-OCH₃, 8-CH₃ | " | " | " | " |
| " | 5,8-di-OCH₃ | " | " | " | " |

TABLE 14-continued

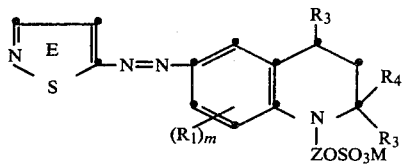

| Substituents on Ring E | $(R_1)_m$ | $R_3$ | $R_4$ | Z | M |
|---|---|---|---|---|---|
| " | 5,8-di-CH$_3$ | " | " | " | " |
| " | 7-Cl | " | " | " | " |
| " | 5,8-di-Cl | " | " | " | " |
| 3-CH$_3$—4-CN | None | " | " | " | Na$^+$ |
| " | 5-OCH$_3$, 8-CH$_3$ | CH$_3$ | " | " | " |
| " | 7-NHCHO | " | " | " | " |
| 3-CH$_3$—4-COOC$_2$H$_5$ | 7-NHCOCH$_3$ | " | " | " | " |
| " | 7-NHCOCH$_2$OCH$_3$ | " | " | " | " |
| " | 7-NHCOOC$_2$H$_5$ | " | " | " | " |
| 3-CH$_3$ | 7-NHCOC$_6$H$_5$ | " | " | " | " |
| " | 7-NHCONHC$_2$H$_5$ | " | " | " | K$^+$ |
| 3-CH$_3$—4-Cl | 7-NHCOC$_6$H$_{11}$ | " | " | " | " |
| " | None | " | " | " | " |
| " | 7-CH$_3$ | H | " | " | " |
| " | " | " | H | " | " |
| 3-Cl—4-CN | " | " | CH$_3$ | " | " |
| 3-Br—4-COOCH$_3$ | " | " | " | " | " |
| 3-CH$_3$—4-COOCH$_3$ | " | " | " | " | " |
| 3-CH$_3$—4-CONH$_2$ | " | " | " | " | " |
| 3-CH$_3$—4-COOCHC$_2$H$_4$OH | " | " | " | " | " |
| 3-CH$_3$—4-CONHC$_4$H$_9$-n | 7-OCH$_3$ | " | " | " | " |
| 3-CH$_3$—4-CONHC$_3$H$_6$OCH$_3$ | 7-CH$_3$ | " | " | " | " |
| 3-CH$_3$—4-COOC$_2$H$_4$OCH$_3$ | " | " | " | " | " |
| 3-CH$_3$—4-SCH$_2$CH$_2$OH | " | " | " | " | " |
| 3-CH$_3$—4-SCH$_2$CH$_2$OCOCH$_3$ | " | " | " | " | " |
| 3-CH$_3$—4-SCH$_3$ | " | " | " | " | " |
| 3-CH$_3$—4-SO$_2$CH$_3$ | " | " | " | " | " |
| 3-CH$_3$—4-SC$_6$H$_5$ | None | " | " | " | " |
| 3-CH$_3$—4-SC$_6$H$_4$—p-C(CH$_3$)$_3$ | " | " | " | " | " |
| 3-CH$_3$—4-SC$_6$H$_4$—p-Cl | " | " | " | " | " |
| 3-CH$_3$-4-S-C(=N)-benzothiazolyl | " | " | " | " | " |
| 3-CH$_3$-4-S-C(=N)-benzoxazolyl | 7-CH$_3$ | " | " | " | " |
| 3-CH$_3$-4-S-C(=N)-imidazolyl | " | " | " | " | " |
| 3-CH$_3$—SC$_6$H$_{11}$ | " | " | " | —CH$_2$CH$_2$OCH$_2$CH$_2$— | " |
| 3-CH$_3$—4-SCN | " | " | " | —CH$_2$CH$_2$SCH$_2$CH$_2$— | " |
| 3-CH$_3$—4-OC$_6$H$_5$ | " | " | " | —CH$_2$CH$_2$SO$_2$CH$_2$CH$_2$— | " |
| 3-CH$_3$—4-OC$_2$H$_5$ | " | " | " | —CH$_2$CH$_2$N(SO$_2$CH$_3$)CH$_2$CH$_2$— | " |
| 3-CH$_3$—4-SCH$_2$CH=CH$_2$ | " | " | " | —CH$_2$CH$_2$SO$_2$NHCH$_2$CH$_2$— | " |
| 3-CH$_3$—4-Br | " | " | " | —CH$_2$CH$_2$CH$_2$NHCOCH$_2$— | " |
| " | " | " | " | —CH$_2$CH$_2$CONHCH$_2$CH$_2$— | " |
| " | " | " | " | —CH$_2$CH$_2$N(COC$_6$H$_5$)CH$_2$CH$_2$— | " |
| " | " | " | " | —CH$_2$CH$_2$(CH$_3$)— | " |
| " | " | " | " | —CH$_2$CH(OSO$_3$Na)CH$_2$— | Na$^+$ |
| " | " | " | " | —CH$_2$CH(CH$_2$)Cl— | " |
| " | " | " | " | —CH$_2$CH(C$_6$H$_5$)— | " |
| " | " | " | " | —CH$_2$CH(CH$_2$OC$_6$H$_5$)— | " |
| " | " | " | " | —CH$_2$CH$_2$CH$_2$N(CH$_3$)SO$_2$CH$_2$CH$_2$— | " |
| " | " | " | " | —CH$_2$CH$_2$CH$_2$— | " |

TABLE 15

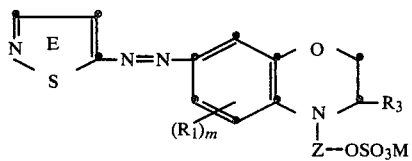

| Substituents on Ring E | $(R_1)_m$ | $R_3$ | Z | M |
|---|---|---|---|---|
| 3-$CH_2$—Cl | None | H | —$CH_2CH_2$— | $Na^+$ |
| " | 6-$CH_3$ | " | " | " |
| " | " | 3-$CH_3$ | " | " |
| " | 6-$OCH_3$ | " | " | " |
| 3-Cl—4-CN | " | H | " | " |
| " | 6-$CH_3$ | 3-$CH_3$ | —$CH_2CH_2CH_2CH_2$— | " |
| 3-$CH_3$ | " | " | —$CH_2CH_2$— | " |
| 3-$CH_3$—4-$COOC_2H_5$ | " | " | " | " |
| 3-$CH_3$—4-$CONH_2$ | " | " | " | " |
| 3-$CH_3$—4-$CONHC_2H_4OH$ | " | " | " | " |
| 3-$CH_3$—4-$CONHC_4H_9$-n | " | " | " | " |
| 3-$CH_3$—4-$CONHC_3H_6OCH_3$ | " | " | " | " |
| 3-$CH_3$—4-$CO_2CH_2CH_2OCH_3$ | " | " | " | " |
| 3-$CH_3$—4-$CONHCH_3$ | " | " | " | " |
| 3-$CH_3$—4-Br | 6-$NHCOCH_3$ | " | " | $K^+$ |
| " | 6-$NHCOC_6H_5$ | " | " | " |
| " | 6-$NHCOC_4H_9$-n | " | " | " |
| " | 6-$NHCONHC_2H_5$ | " | " | " |
| " | 6-$NHCOCH_2OCH_3$ | " | " | " |
| " | 6-$NHCOCH_2CN$ | " | " | " |
| 3-$CH_3$—4-$SC_2H_5$ | 6-$CH_3$ | " | " | $Na^+$ |
| 3-$CH_3$—4-$SCH_2CH_2OH$ | " | " | " | " |
| 3-$CH_3$—4-$SCH_3CH=CH_2$ | " | " | " | " |
| 3-$CH_3$—4-S—$CH_2CH_2OCOCH_3$ | " | " | " | " |
| 3-$CH_3$—4-S—$C_6H_5$ | " | " | " | " |
| 3-$CH_3$—4-S—$C_6H_4$-p-$C(CH_3)_2$ | " | " | " | " |
| 3-$CH_3$—4-S—$C_6H_{11}$ | " | " | " | " |
| 3-$CH_3$—4-$SO_2CH_2CH_2OH$ | " | " | " | " |
| 3-$CH_3$—4-$SO_2CH_2CH_3$ | " | " | " | " |
| 3-$CH_3$—4-$OC_6H_5$ | 6-NHCHO | " | " | " |
| 3-$CH_3$—4-$OC_6H_4$-p-$OCH_3$ | 6-$CH_3$ | " | " | " |
| 3-$CH_3$—4-S—(benzothiazolyl) | " | " | " | " |
| 3-$CH_3$—4-S—(thiadiazolyl-NHCOCH$_3$) | " | " | " | " |
| 3-$CH_3$—4-S—(triazolyl) | " | " | " | " |
| 3-$CH_3$—-$SCH_2CH(OH)CH_2OH$ | " | " | " | " |
| 3-$CH_3$—4-$SCH_2COOCH_3$ | " | " | " | " |
| 3-$CH_3$—4-$OC_2H_5$ | " | " | " | " |
| 3-$CH_3$—4-Br | " | " | " | " |
| " | " | " | —$CH_2CH(CH_3)$— | " |
| " | " | " | —$CH_2CH(C_6H_5)$— | " |
| " | " | " | —$CH_2CH(CH_2Cl)$— | " |
| " | " | " | —$CH_2CH(OSO_3K)CH_2$— | " |
| " | " | " | —$CH_2CH(CH_2OC_6H_5)$— | " |
| " | " | " | —$CH_2CH_2OCH_2CH_2$— | " |
| " | " | " | —$CH_2CH_2SCH_2CH_2$— | " |
| " | " | " | —$CH_2CH_2SO_2CH_2CH_2$— | " |
| " | " | " | —$CH_2CH_2N(SO_2CH_3)CH_2CH_2$— | " |
| " | " | " | —$CH_2CH_2N(SO_2C_6H_5)CH_2CH_2$— | " |
| " | " | " | —$CH_2CH_2SO_2N(CH_3)CH_2CH_2$— | " |
| " | " | " | —$CH_2CH_2NHCOCH_2$— | " |
| " | " | " | —$CH_2CH_2CH_2NHSO_2CH_2CH_2$— | " |
| " | " | " | —$CH_2CH_2CONHCH_2CH_2$— | " |
| " | " | " | —$CH_2CH_2CONHCH_2CH_2CH_2$— | " |
| " | " | " | —$CH_2CH_2SO_2N(C_6H_5)CH_2CH_2$— | " |
| " | " | " | —$CH_2CH_2NHCONHCH_2CH_2$— | " |
| " | " | " | —$CH_2CH_2CH_2$— | " |
| " | " | " | —$CH_2CH_2CH_2CH_2$—S—$CH_2CH_2$— | " |

TABLE 16

[Structure: pyrazole ring (with N-A, ring F) connected via -N=N- to a benzene ring bearing (R₁)ₘ, with -N(R₂)(Z-OSO₃M) substituent]

| A | Substituents on Ring F | (R₁)ₘ | R₂ | Z | M |
|---|---|---|---|---|---|
| H | 4-CN | None | C₂H₅ | —CH₂CH₂— | K⁺ |
| " | " | " | C₆H₁₁ | " | " |
| " | " | " | C₆H₅ | " | " |
| " | " | 3-CH₃ | C₂H₅ | " | " |
| " | " | " | CH₂C₆H₅ | " | " |
| " | " | " | CH₂CH₂OCH₃ | —CH₂CH₂CH₂CH₂— | " |
| " | " | " | CH₂CH₂CONH₂ | —CH₂CH₂— | " |
| " | " | " | CH₂CH₂Cl | " | " |
| " | " | 3-NHCOCH₃ | C₂H₅ | " | " |
| " | " | 2-CH₃—5-NHCOCH₃ | " | " | " |
| " | " | 2-OCH₃—5-CH₃ | " | " | " |
| " | " | 2-Cl | " | " | " |
| " | " | 2-CH₃ | " | " | " |
| " | " | 2,5-di-Cl | " | " | " |
| " | " | 2-OCH₃—5-Cl | " | " | " |
| " | " | 2-OCH₃—5-CH₃ | " | " | " |
| C₆H₅ | 3-SC₂H₅—4-CN | 2,5-di-CH₃ | " | " | Na⁺ |
| " | 3-SC₂H₅—4-COOCH₃ | 3-CH₃ | CH₂-(furan-like ring with O) | " | " |
| " | 3-SC₂H₅—4-CONH₂ | 3-CH₃ | CH₂CH₂N(COCH₂)(COCH₂) [phthalimide-type] | —CH₂CH(CH₂Cl)— | " |
| " | 3-SCH₃—4-CN | 3-CH₃ | CH₂CH₂N(CO)(CO)-benzene | —CH₂CH₂— | NH₄⁺ |
| " | " | 3-CH₃ | CH₂CH₂N(CO—CH₂)(CH₂CH₂) | " | K⁺ |
| " | " | 3-CH₃ | CH₂CH₂NHSO₂CH₃ | " | " |
| " | " | 3-CH₃ | CH₂CH₂CH₂NHCOCH₃ | " | " |
| SO₂C₆H₅ | " | None | CH₃ | —CH₂CH₂— | " |
| COCH₃ | 4-CN | 3-CH₃ | CH₂CH(CH₃)₂ | —CH₂CH₂OCH₂CH₂— | " |
| H | " | " | CH₂C₆H₁₁ | —CH₂CH₂— | " |
| " | " | " | CH₂CH₂OC₆H₅ | " | " |
| " | " | " | CH(CH₃)₂ | " | " |
| COOC₂H₅ | " | H | —CH₂CH₃ | " | K⁺ |
| H | " | " | CH₂CH₂OCH₂CH₂OC₂H₅ | " | " |
| CH₃ | 4-CN | 3-CH₃ | —CH₂CH₃ | " | " |
| " | 4-COOCH₃ | " | " | " | " |
| " | 4-CONH₂ | " | " | " | " |
| —CH₂CH₃ | 4-CN | " | " | " | " |
| C₂H₅ | " | 3-NHCOC₆H₅ | " | " | " |
| " | 4-COOCH₃ | 3-NHCONHC₂H₅ | " | " | " |
| C₆H₄-p-Cl | " | 3-NHCOCH₂OCH₃ | " | " | " |
| C₆H₄-o-CH₃ | " | 3-NHCOC₆H₁₁ | " | " | " |
| C₆H₅ | " | 3-NHCOOC₂H₅ | " | CH₂CH(CH₃)— | " |
| " | " | 3-NHCOCH₂N | " | CH₂CH(CH₂OCH₃)— | " |
| H | 4-CONHC₂H₄OH | " | " | —CH₂CH₂— | " |
| " | 4-CONHC₄H₉-n | None | " | " | " |
| " | 4-COOC₂H₄OCH₃ | " | " | " | " |
| " | 4-CONHC₃H₆OCH₃ | 3-CH₃ | " | —CH₂CH₂SCH₂CH₂— | " |
| " | 4-CN | " | " | —CH₂CH₂SO₂CH₂CH₂CH₂— | " |
| " | " | " | " | —CH₂CH₂N(SO₂CH₃)CH₂CH₂— | " |
| " | " | " | " | —CH₂CH₂N(COCH₃)CH₂CH₂— | " |
| " | " | " | " | —CH₂CH₂SO₂NHCH₂CH₂— | " |
| SO₂CH₃ | 4-CN | " | " | —CH₂CH₂— | " |
| SO₂C₆H₅ | " | " | " | " | " |
| SO₂CH₂CH₃ | " | " | " | —CH₂CH₂CONHC₂H₄— | " |
| H | " | " | " | —CH₂CH₂NHCOCH₂— | " |
| " | " | " | " | —CH₂CH₂NHSO₂CH₂CH₂— | " |
| " | " | 3-NHCOC₆H₅ | " | —CH₂CH₂— | " |
| " | " | 3-NHCOOC₂H₅ | " | " | " |
| " | " | 3-CH₃ | —CH₂CH₂OSO₃Na | " | Na⁺ |
| " | " | " | —C₂H₅ | —CH₂CH(OSO₃Na)CH₂— | " |

TABLE 17

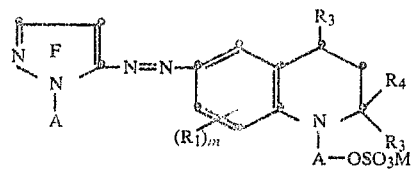

| A | Substituents on Ring F | $(R_1)_m$ | $R_3$ | $R_4$ | Z | M |
|---|---|---|---|---|---|---|
| H | 4-CN | None | $CH_3$ | $CH_3$ | $-CH_2CH_2-$ | $K^+$ |
| " | " | " | H | $CH_3$ | " | " |
| " | " | 7-$CH_3$ | " | " | " | " |
| " | " | " | $CH_3$ | " | " | " |
| " | " | 7-$CH_3$ | H | $CH(CH_3)_2$ | " | " |
| " | " | 7-$OCH_3$ | " | $CH_3$ | " | " |
| " | " | 5-$OCH_3$, 8-$CH_3$ | " | " | " | " |
| " | " | 5,8-di-$OCH_3$ | " | " | " | " |
| " | " | 5,8-di-$CH_3$ | " | " | " | " |
| " | " | 7-Cl | " | " | " | " |
| " | " | 5,8-di-Cl | " | " | " | " |
| $CH_3$ | " | None | " | " | " | $Na^+$ |
| " | " | 5-$OCH_3$, 8-$CH_3$ | $CH_3$ | " | " | " |
| H | 4-$COOCH_3$ | 7-NHCHO | " | " | " | " |
| H | 4-$COOC_2H_5$ | 7-$NHCOCH_3$ | " | " | " | " |
| H | 4-$COOC_2H_4OCH_3$ | 7-$NHCOCH_2OCH_3$ | " | " | " | " |
| H | 4-$CONH_2$ | 7-$NHCOOC_2H_5$ | " | " | " | " |
| H | 4-$CONHC_2H_5$ | 7-$NHCOC_6H_5$ | " | " | " | " |
| " | " | 7-$NHCONHC_2H_5$ | " | " | " | $K^+$ |
| " | " | 7-$NHCOC_6H_{11}$ | " | " | " | " |
| $C_6H_5$ | 4-CN | None | " | " | " | " |
| " | " | 7-$CH_3$ | H | " | " | " |
| $C_6H_4$-p-Cl | " | " | " | H | " | " |
| $C_6H_4$-p-$CH_3$ | " | " | " | $CH_3$ | " | " |
| $SO_2CH_3$ | " | " | " | " | " | " |
| " | 4-$COOCH_3$ | " | " | " | " | " |
| $SO_2C_6H_5$ | " | " | " | " | " | " |
| " | 4-CN | " | " | " | " | " |
| " | 4-$CONH_2H_4OH$ | 7-$OCH_3$ | " | " | " | " |
| " | 4-$COOCH(CH_3)_2$ | 7-$CH_3$ | " | " | " | " |
| $CH_3$ | 3-$SC_2H_5$-4-CN | " | " | " | " | " |
| $C_6H_5$ | " | " | " | " | " | " |
| " | 3-$SC_2H_5$-4-$COOCH_3$ | " | " | " | " | " |
| " | 3-$SCH_3$-4-$COOC_2H_5$ | " | " | " | " | " |
| " | 3-$SO_2CH_3$-4-$COOCH_3$ | " | " | " | " | " |
| " | 3-$SC_6H_5$-4-$COOCH_3$ | None | " | " | " | " |
| $COCH_3$ | 4-CN | " | " | " | " | " |
| " | 4-$COOCH_3$ | " | " | " | " | " |
| $CH_2CH_2OH$ | " | " | " | " | " | " |
| H | 3-$CH_2CN$-4-CN | 7-$CH_3$ | " | " | " | " |
| H | 3-$CH_2CONH_2$-4-CN | " | " | " | " | " |
| H | 4-CN | " | " | " | $-CH_2CH_2OCH_2CH_2-$ | " |
| " | " | " | " | " | $-CH_2CH_2SCH_2CH_2-$ | " |
| " | " | " | " | " | $-CH_2CH_2SO_2CH_2CH_2-$ | " |
| " | " | " | " | " | $-CH_2CH_2N(SO_2CH_3)CH_2CH_2-$ | " |
| " | " | " | " | " | $-CH_2CH_2SO_2NHCH_2CH_2-$ | " |
| " | " | " | " | " | $-CH_2CH_2CH_2NHCOCH_2$ | " |
| " | " | " | " | " | $-CH_2CH_2CONHCH_2CH_2-$ | " |
| " | " | " | " | " | $-CH_2CH_2N(COC_6H_5)CH_2CH_2-$ | " |
| " | " | " | " | " | $-CH_2CH(CH_3)_2-$ | " |
| " | " | " | " | " | $-CH_2CH(OSO_3Na)CH_2-$ | $Na^+$ |
| " | " | " | " | " | $-CH_2CH(CH_2Cl)-$ | " |
| " | " | " | " | " | $-CH_2CH(CH_2OCH_3)-$ | " |
| " | " | " | " | " | $-CH_2CH(C_6H_5)-$ | " |
| " | " | " | " | " | $-CH_2CH(CH_2OC_6H_5)-$ | " |
| " | " | " | " | " | $-CH_2CH_2CH_2N(CH_3)SO_2CH_2CH_2-$ | " |
| " | " | " | " | " | $-CH_2CH_2CH_2-$ | " |

TABLE 18

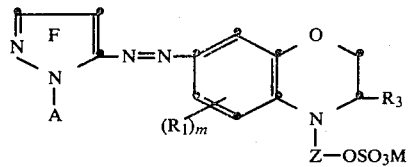

| A | Substituents on Ring F | $(R_1)_m$ | $R_3$ | Z | M |
|---|---|---|---|---|---|
| H | 4-CN | None | H | $-CH_2CH_2-$ | $Na^+$ |
| " | " | 6-$CH_3$ | " | " | " |
| $CH_3$ | " | " | 3-$CH_3$ | " | " |
| " | 4-$COOCH_3$ | 6-$OCH_3$ | " | " | " |
| " | 4-$COOC_2H_4OC_2H_5$ | " | H | " | " |
| " | 4-$CONH_2$ | 6-$CH_3$ | 3-$CH_3$ | $-CH_2CH_2CH_2CH_2-$ | " |
| " | 4-$CONHC_2H_4OH$ | " | " | $-CH_2CH_2-$ | " |
| " | 4-$CONHC_3H_6OCH_3$ | " | " | " | " |
| " | 4-$CONHC_2H_4NHCOCH_3$ | " | " | " | " |
| $-CH_2CH_3$ | 4-CN | " | " | " | " |
| $C_6H_5$ | " | " | " | " | " |
| " | 4-$COOCH_2CH_3$ | " | " | " | " |
| " | 4-$CONH_2$ | " | " | " | " |
| $C_6H_4$-o-Cl | " | " | " | " | " |
| H | " | 6-$NHCOCH_3$ | " | " | $K^+$ |
| " | 4-$COOCH_3$ | 6-$NHCOC_6H_5$ | " | " | " |
| " | " | 6-$NHCOC_4H_9$-n | " | " | " |
| " | 4-$CONHC_4H_9$-n | 6-$NHCONHC_2H_5$ | " | " | " |
| " | " | 6-$NHCOCH_2OCH_3$ | " | " | " |
| " | " | 6-$NHCOCH_2CN$ | " | " | " |
| $SO_2CH_3$ | H—CN | 6-$CH_3$ | " | " | $Na^+$ |
| " | 4-$COOCH_3$ | " | " | " | " |
| H | 3-$CH_2CN$-4-CN | " | " | " | " |
| $C_6H_5$ | 3-$SCH_3$-4-CN | " | " | " | " |
| " | 3-$SCH_2CH_3$-4-CN | " | " | " | " |
| " | 3-$SCH_2CH_3$-4-$COOCH_3$ | " | " | " | " |
| " | 3-$SCH_3$-4-$CONHC_4H_9$-n | " | " | " | " |
| $SO_2C_6H_5$ | 4-CN | " | " | " | " |
| " | 4-$COOCH_3$ | " | " | " | " |
| $SO_2C_6H_4$-p-$CH_3$ | 4-CN | 6-NHCHO | " | " | " |
| $SO_2C_4H_9$-n | " | 6-$CH_3$ | " | " | " |
| $COCH_3$ | " | " | " | " | " |
| $COOC_2H_5$ | " | " | " | " | " |
| $CH_2CH_2OH$ | " | " | " | " | " |
| $C_6H_4$—O—$CH_3$ | " | " | " | " | " |
| " | 4-$COOCH_3$ | " | " | " | " |
| " | 4-$COOCH(CH_3)_2$ | " | " | " | " |
| $SO_2C_6H_{11}$ | " | " | " | " | " |
| H | 4-CN | " | " | $-CH_2CH(CH_3)-$ | " |
| " | " | " | " | $-CH_2CH(C_6H_5)-$ | " |
| " | " | " | " | $-CH_2CH(CH_2Cl)-$ | " |
| " | " | " | " | $-CH_2CH(OSO_3K)CH_2-$ | " |
| " | " | " | " | $-CH_2CH(CH_2OC_6H_5)-$ | " |
| " | " | " | " | $-CH_2CH_2OCH_2CH_2-$ | " |
| " | " | " | " | $-CH_2CH_2SCH_2CH_2-$ | " |
| $C_6H_5$ | " | " | " | $-CH_2CH_2SO_2CH_2CH_2-$ | " |
| " | " | " | " | $-CH_2CH_2N(SO_2CH_3)CH_2CH_2-$ | " |
| " | " | " | " | $-CH_2CH_2N(SO_2C_6H_5)CH_2CH_2-$ | " |
| " | " | " | " | $-CH_2CH_2SO_2N(CH_3)CH_2CH_2-$ | " |
| " | " | " | " | $-CH_2CH_2NHCOCH_2-$ | " |
| " | " | " | " | $-CH_2CH_2CH_2NHSO_2CH_2CH_2-$ | " |
| " | " | " | " | $-CH_2CH_2CONHCH_2CH_2-$ | " |
| " | " | " | " | $-CH_2CH_2CONHCH_2CH_2CH_2CH_2-$ | " |
| " | " | " | " | $-CH_2CH_2SO_2N(C_6H_5)CH_2CH_2-$ | " |
| " | " | " | " | $-CH_2CH_2NHCONHCH_2CH_2-$ | " |
| " | " | " | " | $-CH_2CH_2-$ | " |
| " | " | " | " | $-CH_2CH_2CH_2CH_2-S-CH_2CH_2-$ | " |

TABLE 19

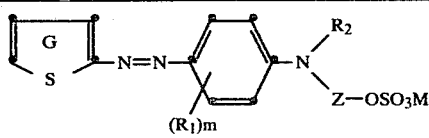

| Substituents on Ring G | $(R_1)m$ | $R_2$ | Z | M |
|---|---|---|---|---|
| 3,5-di-CN-4-$CH_3$ | None | $C_2H_5$ | $-CH_2CH_2-$ | $K^+$ |
| " | " | $C_6H_{11}$ | " | " |

TABLE 19-continued

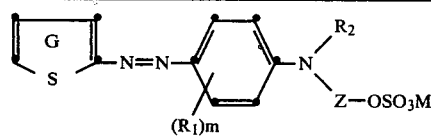

| Substituents on Ring G | $(R_1)_m$ | $R_2$ | Z | M |
|---|---|---|---|---|
| " | " | $C_6H_5$ | " | " |
| | $3CH_3$ | $C_2H_5$ | " | " |
| 3-CN-5-$C_6H_5$ | " | $CH_2C_6H_5$ | " | " |
| 3-COOCH$_3$-5-$C_6H_5$ | " | $CH_2CH_2OCH_3$ | —$CH_2CH_2CH_2CH_2$— | " |
| 3-CONH$_2$-5-$C_6H_5$ | " | $CH_2CH_2CONH_2$ | —$CH_2CH_2$— | " |
| 3-CONHC$_2$H$_5$-5-$C_6H_5$ | " | $CH_2CH_2Cl$ | " | " |
| 3-COOCH$_3$ | 3-NHCOCH$_3$ | $C_2H_5$ | " | " |
| 3-CN | 2-CH$_3$-5-NHCOCH$_3$ | H | " | " |
| 3-CN-4-CH$_3$-5-COOC$_2$H$_5$ | 2-OCH$_3$-5-CH$_3$ | " | " | " |
| " | 2-Cl | " | " | " |
| " | 2-CH$_3$ | " | " | " |
| " | 2,5-di-Cl | " | " | " |
| 3-CN-4-CH$_3$-5-COCH$_3$ | 2-OCH$_3$-5-Cl | " | " | " |
| 3-COOCH$_3$-4-CH$_3$-5-CN | 2-OCH$_3$-5-CH$_3$ | " | " | " |
| 3-COOCH$_3$-4-CH$_3$-5-COC$_6$H$_5$ | 2,5-di-CH$_3$ | " | " | Na$^+$ |
| 3-COOCH$_3$-5-COC$_6$H$_5$ | 3-CH$_3$ | " | " | " |
| 3-COOCH$_3$-5-COCH(CH$_3$)$_2$ | 3-CH$_3$ | CH$_2$CH$_2$N(COCH$_2$-O-CH$_2$)(COCH$_2$) (furan-dione group) | —CH$_2$CH(CH$_2$Cl)— | " |
| " | 3-CH$_3$ | CH$_2$CH$_2$N(CO-C$_6$H$_4$-CO) (phthalimide) | —CH$_2$CH$_2$— | NH$_4^+$ |
| " | 3-CH$_3$ | CH$_2$CH$_2$N(CO—CH$_2$-O-CH$_2$CH$_2$) | " | K$^+$ |
| " | 3-CH$_3$ | CH$_2$CH$_2$NHSO$_2$CH$_3$ | " | " |
| " | 3-CH$_3$ | CH$_2$CH$_2$CH$_2$NHCOCH$_3$ | " | " |
| " | None | CH$_3$ | —CH$_2$CH$_2$— | " |
| 3-SO$_2$C$_6$H$_5$-5-COCH$_3$ | 3-CH$_3$ | CH$_2$CH(CH$_3$)$_2$ | —CH$_2$CH$_2$OCH$_2$CH$_2$— | " |
| 3-SO$_2$CH$_3$-5-CN | " | CH$_2$C$_6$H$_{11}$ | —CH$_2$CH$_2$— | " |
| 3-SO$_2$C$_6$H$_5$-5-Br | " | CH$_2$CH$_2$OC$_6$H$_5$ | " | " |
| 3,5-di-SO$_2$CH$_3$ | " | CH(CH$_3$)$_2$ | " | " |
| 3,5-di-SO$_2$NH$_2$ | H | —CH$_2$CH$_3$ | " | K$^+$ |
| 3,5-di-SO$_2$N(C$_2$H$_5$)$_2$ | " | CH$_2$CH$_2$OCH$_2$CH$_2$OC$_2$H$_5$ | " | " |
| 3-CN-5-COCH$_3$ | 3-CH$_3$ | —CH$_2$CH$_3$ | " | " |
| 3-CN-5-COOC(CH$_3$)$_2$ | " | " | " | " |
| 3-CN-5-COOC$_2$H$_5$ | " | " | " | " |
| 3-CONH$_2$-5-COOC$_2$H$_5$ | " | " | " | " |
| 3-CONH$_2$-5-COCH(CH$_3$)$_2$ | 3-NHCOC$_6$H$_5$ | " | " | " |
| 3-CONHC$_2$H$_4$OH-5-COCH(CH$_3$)$_2$ | 3-NHCONHC$_2$H$_5$ | " | " | " |
| " | 3-NHCOCH$_2$OCH$_3$ | " | " | " |
| " | 3-NHCOC$_6$H$_{11}$ | " | " | " |
| " | 3-NHCOOC$_2$H$_5$ | " | CH$_2$CH(CH$_3$)— | " |
| " | 3-NHCOCH$_2$CN | " | CH$_2$CH(CH$_2$OCH$_3$)— | " |
| 3-CONHC$_3$H$_6$OCH$_3$-5-COCH(CH$_3$)$_2$ | " | " | —CH$_2$CH$_2$— | " |
| 3-CONHC$_4$H$_9$-n-5-COCH(CH$_3$)$_2$ | None | " | " | " |
| 3-CONHC$_2$H$_4$OH-5-COCH(CH$_3$)$_2$ | " | " | " | " |
| 3-COOCH$_3$-5-SO$_2$CH$_3$ | 3-CH$_3$ | " | —CH$_2$CH$_2$SCH$_2$CH$_2$— | " |
| 3-CONHC$_2$H$_5$-5-SO$_2$CH$_3$ | " | " | —CH$_2$CH$_2$SO$_2$CH$_2$CH$_2$CH$_2$CH$_2$— | " |
| 3-CONH$_2$-5-SO$_2$CH$_3$ | " | " | —CH$_2$CH$_2$N(SO$_2$CH$_3$)CH$_2$CH$_2$— | " |
| 3-CONH$_2$-5-SO$_2$C$_4$H$_9$-n | " | " | —CH$_2$CH$_2$N(COCH$_3$)CH$_2$CH$_2$— | " |
| 3-COOCH$_3$-H—CH$_3$-5-SCN | " | " | —CH$_2$CH$_2$SO$_2$NHCH$_2$CH$_2$— | " |
| 3-CHO-4-CH$_3$ | " | " | —CH$_2$CH$_2$— | " |
| 3-CONH$_2$-5-C$_6$H$_4$-p-CH$_3$ | " | " | " | " |
| 3-CN-5-COOC$_2$H$_5$ | " | " | —CH$_2$CH$_2$CONHC$_2$H$_4$— | " |
| 3-COOCH$_3$-5-COCH(CH$_3$)$_2$ | " | " | —CH$_2$CH$_2$NHCOCH$_2$— | " |
| " | " | " | —CH$_2$CH$_2$NHSO$_2$CH$_2$CH$_2$— | " |
| " | 3-NHCOC$_6$H$_5$ | " | —CH$_2$CH$_2$— | " |
| " | 3-NHCOOC$_2$H$_5$ | " | " | " |
| " | 3-CH$_3$ | —CH$_2$CH$_2$OSO$_3$Na | " | Na$^+$ |
| " | " | —C$_2$H$_5$ | —CH$_2$CH(OSO$_3$Na)CH$_2$— | " |

TABLE 20

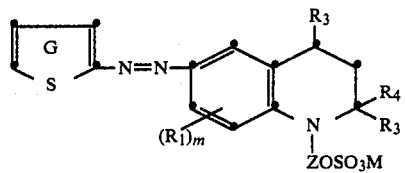

| Substituents on Ring G | $(R_1)_m$ | $R_3$ | $R_4$ | Z | M |
|---|---|---|---|---|---|
| 3-CONHC$_2$H$_5$-5-COCH(CH$_3$)$_2$ | None | CH$_3$ | CH$_3$ | —CH$_2$CH$_2$— | K$^+$ |
| " | " | H | CH$_3$ | " | " |
| 3-CONH$_2$-5-COCH(CH$_3$)$_2$ | 7-CH$_3$ | " | " | " | " |
| " | " | CH$_3$ | " | " | " |
| " | 7-CH$_3$ | H | CH(CH$_3$)$_2$ | " | " |
| " | 7-OCH$_3$ | " | CH$_3$ | " | " |
| " | 5-OCH$_3$, 8-CH$_3$ | " | " | " | " |
| " | 5,8-di-OCH$_3$ | " | " | " | " |
| " | 5,8-di-CH$_3$ | " | " | " | " |
| " | 7-Cl | " | " | " | " |
| " | 5,8-di-Cl | " | " | " | " |
| 3-COOCH$_3$-5-COCH(CH$_3$)$_2$ | None | " | " | " | Na$^+$ |
| " | 5-OCH$_3$, 8-CH$_3$ | CH$_3$ | " | " | " |
| " | 7-NHCHO | " | " | " | " |
| " | 7-NHCOCH$_3$ | " | " | " | " |
| " | 7-NHCOCH$_2$OCH$_3$ | " | " | " | " |
| 3,5-di-CN-4-CH$_3$ | 7-NHCOOC$_2$H$_5$ | " | " | " | " |
| " | 7-NHCOC$_6$H$_5$ | " | " | " | " |
| " | 7-NHCONHC$_2$H$_5$ | " | " | " | K$^+$ |
| " | 7-NHCOC$_6$H$_{11}$ | " | " | " | " |
| " | None | " | " | " | " |
| 3-CONH$_2$-5-C$_6$H$_5$ | 7-CH$_3$ | H | " | " | " |
| " | " | " | H | " | " |
| 3-COOCH$_3$-5-C$_6$H$_5$ | " | " | CH$_3$ | " | " |
| 3-COOCH$_3$-5-COCH$_3$ | " | " | " | " | " |
| 3-CN-5-COOC$_2$H$_5$ | " | " | " | " | " |
| 3-CN-4-CH$_3$-5-COOC$_2$H$_5$ | " | " | " | " | " |
| 3-CN-4-CH$_3$-5-COCH$_3$ | " | " | " | " | " |
| 3-COOCH$_3$-4-CH$_3$-5-CN | 7-OCH$_3$ | " | " | " | " |
| 3-CN-4-CH$_3$-5-CO$_2$CH$_2$CH$_2$OC$_2$H$_5$ | 7-CH$_3$ | " | " | " | " |
| 3-SO$_2$C$_6$H$_5$-5-COCH$_3$ | " | " | " | " | " |
| 3-SO$_2$C$_6$H$_4$-p-Cl-5-COCH$_3$ | " | " | " | " | " |
| 3-SO$_2$CH$_3$-5-CN | " | " | " | " | " |
| 3-COOCH$_3$-5-Br | " | " | " | " | " |
| 3-COOCH$_3$-5-SCN | " | " | " | " | " |
| 3-CONHC$_2$H$_4$OH-5-COCH(CH$_3$)$_2$ | None | " | " | " | " |
| 3-CONHC$_3$H$_6$OCH$_3$-5-COCH(CH$_3$)$_2$ | " | " | " | " | " |
| 3-CN-5-SO$_2$CH$_3$ | " | " | " | " | " |
| 3,5-di-SO$_2$NH$_2$ | " | " | " | " | " |
| 3,5-di-SO$_2$NHC$_2$H$_5$ | 7-CH$_3$ | " | " | " | " |
| 3-COOCH$_3$-5-COC$_6$H$_5$ | " | " | " | " | " |
| 3-CONHC$_4$H$_9$-n-5-COC$_6$H$_5$ | " | " | " | —CH$_2$CH$_2$OCH$_2$CH$_2$— | " |
| 3-COOCH$_3$-5-SO$_2$CH$_3$ | " | " | " | —CH$_2$CH$_2$SCH$_2$CH$_2$— | " |
| 3-CONHC$_2$H$_4$OH-5-SO$_2$CH$_3$ | " | " | " | —CH$_2$CH$_2$SO$_2$CH$_2$CH$_2$— | " |
| 3-CHO | " | " | " | —CH$_2$CH$_2$N(SO$_2$CH$_3$)CH$_2$CH$_2$— | " |
| 3-SO$_2$C$_6$H$_5$ | " | " | " | —CH$_2$CH$_2$SO$_2$NHCH$_2$CH$_2$— | " |
| 3-CONHC$_2$H$_5$-5-COCH(CH$_3$)$_2$ | " | " | " | —CH$_2$CH$_2$CH$_2$NHCOCH$_2$— | " |
| " | " | " | " | —CH$_2$CH$_2$CONHCH$_2$CH$_2$— | " |
| " | " | " | " | —CH$_2$CH$_2$N(COC$_6$H$_5$)CH$_2$CH$_2$— | " |
| " | " | " | " | —CH$_2$CH$_2$(CH$_3$)— | " |
| " | " | " | " | —CH$_2$CH(OSO$_3$Na)CH$_2$— | Na$^+$ |
| " | " | " | " | —CH$_2$CH(CH$_2$Cl)— | " |
| " | " | " | " | —CH$_2$CH(CH$_2$OCH$_3$)— | " |
| " | " | " | " | —CH$_2$CH(C$_6$H$_5$)— | " |
| " | " | " | " | —CH$_2$CH(CH$_2$OC$_6$H$_5$)— | " |
| 3-COOCH$_3$-4CH$_3$-5-CONH$_2$ | " | " | " | —CH$_2$CH$_2$CH$_2$N(CH$_3$)SO$_2$CH$_2$CH$_2$— | " |
| " | " | " | " | —CH$_2$CH$_2$CH$_2$— | " |

TABLE 21

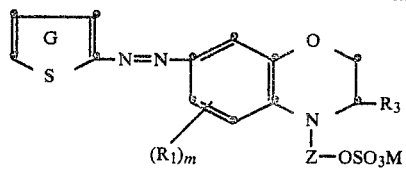

| Substituents on Ring G | $(R_1)_m$ | $R_3$ | Z | M |
|---|---|---|---|---|
| 3-COOCH$_3$-5-COCH(CH$_3$)$_2$ | None | H | —CH$_2$CH$_2$— | Na$^+$ |
| 3-CONH$_2$-5-COCH(CH$_3$)$_2$ | 6-CH$_3$ | " | " | " |
| 3-CN-5-COCH(CH$_3$)$_2$ | " | 3-CH$_3$ | " | " |
| " | 6-OCH$_3$ | " | " | " |
| 3-CONH$_2$-5-C$_6$H$_5$ | " | H | " | " |
| " | 6-CH$_3$ | 3-CH$_3$ | —CH$_2$CH$_2$CH$_2$CH$_2$— | " |
| " | " | " | —CH$_2$CH$_2$— | " |
| 3-CN-5-C$_6$H$_5$ | " | " | " | " |
| 3-CONHC$_2$H$_4$OH—OH-5-C$_6$H$_5$ | " | " | " | " |
| 3-CONHC$_2$H$_5$-5-COC$_6$H$_5$ | " | " | " | " |
| 3-CONHCH$_3$-5-COC$_6$H$_5$ | " | " | " | " |
| 3-CN-4-CH$_3$-5-COOC$_2$H$_5$ | " | " | " | " |
| 3-CN-4-CH$_3$-5-COOC$_2$H$_4$OCH$_3$ | " | " | " | " |
| 3-CHO-4,5-di-CH$_3$ | " | " | " | " |
| 3-CN-4-CH$_3$-5-SCH$_3$ | 6-NHCOCH$_3$ | " | " | K$^+$ |
| 3-COOCH$_3$-4-CH$_3$-5-CONH$_2$ | 6-NHCOC$_6$H$_5$ | " | " | " |
| 3-CONH$_2$-4-CH$_3$-5-CN | 6-NHCOC$_4$H$_9$-n | " | " | " |
| 3,5-di-CN-4-CH$_3$ | 6-NHCONHC$_2$H$_5$ | " | " | " |
| " | 6-NHCOCH$_2$OCH$_3$ | " | " | " |
| " | 6-NHCOCH$_2$CN | " | " | " |
| " | 6-CH$_3$ | " | " | Na$^+$ |
| 3-CONH$_2$-4-CH$_3$-5-COOCH$_3$ | " | " | " | " |
| 3-SO$_2$CH$_3$-5-COCH$_3$ | " | " | " | " |
| 3-SO$_2$C$_6$H$_5$-5-COCH$_3$ | " | " | " | " |
| 3-SO$_2$C$_6$H$_4$-p-Cl-5-COCH$_3$ | " | " | " | " |
| 3-SO$_2$CH$_3$-5-Br | " | " | " | " |
| 3,5-di-SO$_2$CH$_3$ | " | " | " | " |
| 3,5-di-SO$_2$NH$_2$ | " | " | " | " |
| 3,5-di-SO$_2$NHC$_2$H$_5$ | " | " | " | " |
| 3-CONHC$_2$H$_4$OH-5-COCH(CH$_3$)$_2$ | 6-NHCHO | " | " | " |
| 3-CONHC$_3$H$_6$OCH$_3$-5-COCH(CH$_3$)$_2$ | 6-CH$_3$ | " | " | " |
| 3-CONHC$_2$H$_4$NHCOCH$_3$ | " | " | " | " |
| 3-CONHC$_4$H$_9$-n-5-C$_6$H$_5$ | " | " | " | " |
| 3-CN-5-COOC$_2$H$_5$ | " | " | " | " |
| 3-CN-4-CH$_3$-5-COOCH(CH$_3$)$_2$ | " | " | " | " |
| 3-CN-4-CH$_3$—S—CONHC$_2$H$_5$ | " | " | " | " |
| 3-CN-4-CH$_3$-5-CONHC$_6$H$_5$ | " | " | " | " |
| 3-CONH$_2$-5-SO$_2$CH$_3$ | " | " | " | " |
| 3-CONH$_2$-5-COCH(CH$_3$)$_2$ | " | " | —CH$_2$CH(CH$_3$)— | " |
| " | " | " | —CH$_2$CH(C$_6$H$_5$)— | " |
| " | " | " | —CH$_2$CH(CH$_2$Cl)— | " |
| " | " | " | —CH$_2$CH(OSO$_3$K)CH$_2$— | " |
| " | " | " | —CH$_2$CH(CH$_2$OC$_6$H$_5$)— | " |
| " | " | " | —CH$_2$CH$_2$OCH$_2$CH$_2$— | " |
| 3-CONHC$_2$H$_5$-5-COCH(CH$_3$)$_2$ | " | " | —CH$_2$CH$_2$SCH$_2$CH$_2$— | " |
| " | " | " | —CH$_2$CH$_2$SO$_2$CH$_2$CH$_2$— | " |
| " | " | " | —CH$_2$CH$_2$N(SO$_2$CH$_3$)CH$_2$CH$_2$— | " |
| " | " | " | —CH$_2$CH$_2$N(SO$_2$C$_6$H$_5$)CH$_2$CH$_2$— | " |
| " | " | " | —CH$_2$CH$_2$SO$_2$N(CH$_3$)CH$_2$CH$_2$— | " |
| " | " | " | —CH$_2$CH$_2$NHCOCH$_2$— | " |
| " | " | " | —CH$_2$CH$_2$CH$_2$NHSO$_2$CH$_2$CH$_2$— | " |
| " | " | " | —CH$_2$CH$_2$CONHCH$_2$CH$_2$— | " |
| " | " | " | —CH$_2$CH$_2$CONHCH$_2$CH$_2$CH$_2$CH$_2$— | " |
| " | " | " | —CH$_2$CH$_2$SO$_2$N(C$_6$H$_5$)CH$_2$CH$_2$— | " |
| " | " | " | —CH$_2$CH$_2$NHCONHCH$_2$CH$_2$— | " |
| " | " | " | —CH$_2$CH$_2$CH$_2$— | " |
| " | " | " | —CH$_2$CH$_2$CH$_2$CH$_2$—S—CH$_2$CH$_2$— | " |

Although the invention has been described in considerable detail with particular reference to certain preferred embodiments thereof, variations and modifications can be effected within the spirit and scope of the invention.

We claim:
1. A compound of the formula

R—N=N—C wherein R is selected from benzothiazol-2-yl which may have 1-3 substituents selected from lower alkyl, lower alkoxy, thiocyano, lower alkylthio, cyano, carbamoyl, lower alkylcarbamoyl, lower alkoxycarbonyl, acyl, lower alkylsulfonyl, sulfamoyl, SO$_2$NH(lower alkyl), SO$_2$N(di-lower alkyl), lower alkylsulfonamido, acylamido, halogen, trifluoromethyl and SO$_3$(aryl);

2,1-benzisothiazol-3-yl which may have 1-3 substituents selected from lower alkyl, lower alkoxy, chlorine, bromine, SO$_2$NH$_2$, SO$_2$NH(lower alkyl), and SO$_2$N(di-lower alkyl);

1,3,4-thiadiazol-2-yl which may have a substituent selected from lower alkyl, lower alkoxy, halogen, lower alkylsulfonyl, SO$_2$NH$_2$, SO$_2$NH(lower alkyl), SO$_2$N (di-lower alkyl), arylsulfonyl, acylamido, aryl, arylthio, lower alkenylthio, cyclohexylthio, thiocyano, cyclohexylsulfonyl, lower alkylthio, and cyclohexyl;

1,2,4-thiadiazol-5-yl which may have a substituent selected from lower alkyl, aryl, lower alkylthio, cyclohexylthio, and lower alkylsulfonyl;

isothiazol-5-yl which may have 1 or 2 substituents selected from lower alkyl, halogen, cyano, carbamoyl, CONH lower alkyl, alkoxycarbonyl, lower alkylthio, lower alkenylthio, arylthio, cyclohexylthio, s-heterocycle, aryloxy, and lower alkoxy;

pyrazol-5-yl which may have 1 or 2 substituents selected from lower alkyl, lower alkoxycarbonyl, lower alkylthio, aryl, cyano, carbamoyl, lower alkylcarbamoyl, and lower alkylsulfonyl, and the hydrogen on the N may be replaced with lower alkyl, aryl of 6–10 carbons, lower alkylsulfonyl, arylsulfonyl, lower alkanoyl, or lower alkoxycarbonyl; and thiophen-2-yl which may be substituted with 1–3 groups selected from lower alkyl, cyano, lower alkoxycarbonyl, acyl, lower alkylsulfonyl, arylsulfonyl, carbamoyl, lower alkylcarbamoyl, aryl, halogen, sulfamoyl, lower alkylsulfamoyl and formyl; and the coupler C is selected from those of the formulae:

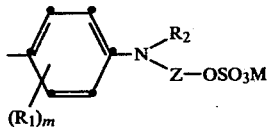

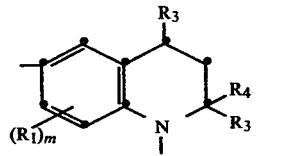

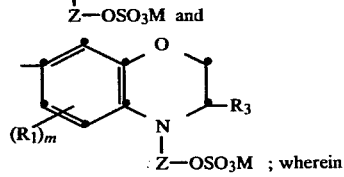; wherein wherein

R$_1$ is selected from hydrogen, lower alkyl, lower alkoxy, halogen, acylamido, lower alkylthio, and aryloxy;

R$_2$ is selected from hydrogen, aryl, cycloalkyl, lower alkenyl and lower alkyl;

R$_3$ and R$_4$ are each selected from hydrogen and lower alkyl;

m is 0, 1 or 2; M is Na$^+$, K$^+$, H$^+$ or NH$_4^+$;

Z is selected from straight or branched chain lower alkylene and divalent groups of the formula —CH$_2$(CH$_2$)$_n$X—CH$_2$(CH$_2$)$_p$—, where n is 1, 2 or 3, p is 0, 1, 2 or 3, and X is O, S, SO$_2$, —SO$_2$NH—, —SO$_2$N(lower alkyl)—, —N(SO$_2$ lower alkyl)—, —N(SO$_2$ aryl)—, —NHCO—, —NHCONH—, and —CON(lower alkyl);

and in the above definition of X, Z, R, R$_1$, and R$_2$, any lower alkyl, lower alkylene, or cyclic radicals may bear up to three substituents selected from hydroxy, lower alkoxy, aryl, aryloxy, cyclohexyl, furyl, lower alkylcyclohexyl, aroyloxy, lower alkoxycarbonyl, lower alkanoyloxy, sulfamoyl, SO$_2$NH(aryl), SO$_2$NH(lower alkyl), SO$_2$N(di-lower alkyl), NHCOO(lower alkyl), NHCONH(lower alkyl), acylamido, lower alkylsulfonamido, succinimido, glutarimido, phthalimido, 2-pyrrolidono, cyano, carbamoyl, lower alkylcarbamoyl, lower alkoxyalkoxy, lower alkylthio, halogen, arylthio, lower alkylsulfonyl and arylsulfonyl.

2. A compound according to claim 1 wherein the diazo is benzothiazol-2-yl as defined therein, and the coupler has the formula

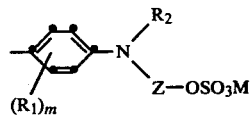

as defined therein.

3. A compound according to claim 1 wherein the diazo is 2,1-benzisothiazol-3-yl as defined therein, and the coupler has the formula

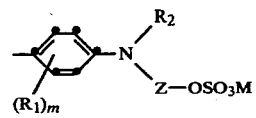

as defined therein.

4. A compound according to claim 1 wherein the diazo is 1,3,4-thiadiazol-2-yl as defined therein, and the coupler has the formula

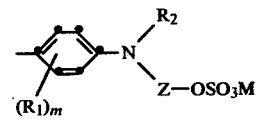

as defined therein.

5. A compound according to claim 1 wherein the diazo is 1,2,4-thiadiazol-5-yl as defined therein, and the coupler has the formula

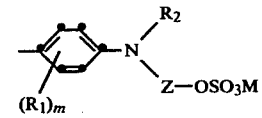

as defined therein.

6. A compound according to claim 1 wherein the diazo is isothiazol-5-yl as defined therein, and the coupler has the formula

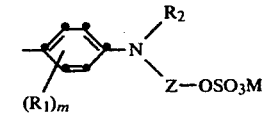

as defined therein.

7. A compound according to claim 1 wherein the diazo is pyrazol-5-yl as defined therein, and the coupler has the formula

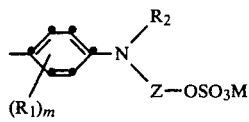

as defined therein.

8. A compound according to claim 1 wherein the diazo is thiophen-2-yl as defined therein, and the coupler has the formula

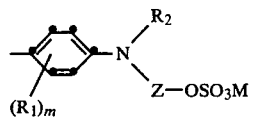

as defined therein.

9. A compound according to claim 1 wherein the diazo is benzothiazol-2-yl as defined therein, and the coupler has the formula

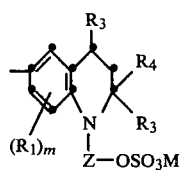

as defined therein.

10. A compound according to claim 1 wherein the diazo is 2,1-benzisothiazol-3-yl as defined therein, and the coupler has the formula

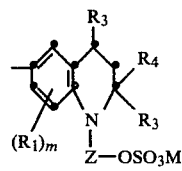

as defined therein.

11. A compound according to claim 1 wherein the diazo is 1,3,4-thiadiazol-2-yl as defined therein, and the coupler has the formula

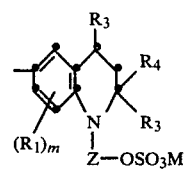

as defined therein.

12. A compound according to claim 1 wherein the diazo is 1,2,4-thiadiazol-5-yl as defined therein, and the coupler has the formula

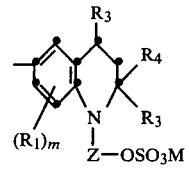

as defined therein.

13. A compound according to claim 1 wherein the diazo is isothiazol-5-yl as defined therein, and the coupler has the formula

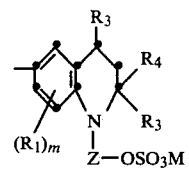

as defined therein.

14. A compound according to claim 1 wherein the diazo is pyrazol-5-yl as defined therein, and the coupler has the formula

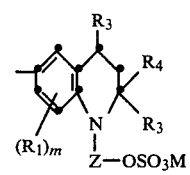

as defined therein.

15. A compound according to claim 1 wherein the diazo is thiophen-2-yl as defined therein, and the coupler has the formula

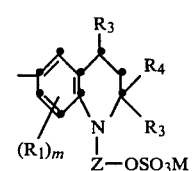

as defined therein.

16. A compound according to claim 1 wherein the diazo is benzothiazol-2-yl as defined therein, and the coupler has the formula

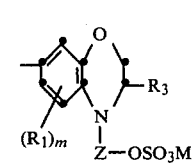

as defined therein.

17. A compound according to claim 1 wherein the diazo is 2,1-benzisothiazol-3-yl as defined therein, and the coupler has the formula

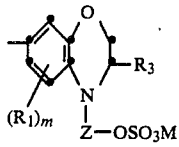

as defined therein.

18. A compound according to claim 1 wherein the diazo is 1,3,4-thiadiazol-2-yl as defined therein, and the coupler has the formula

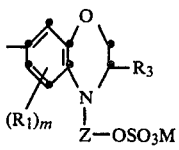

as defined therein.

19. A compound according to claim 1 wherein the diazo is 1,2,4-thiadiazol-5-yl as defined therein, and the coupler has the formula

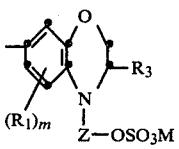

as defined therein.

20. A compound according to claim 1 wherein the diazo is isothiazol-5-yl as defined therein, and the coupler has the formula

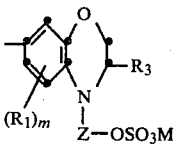

as defined therein.

21. A compound according to claim 1 wherein the diazo is pyrazol-5-yl as defined therein, and the coupler has the formula

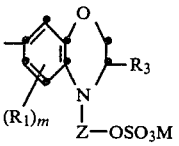

as defined therein.

22. A compound according to claim 1 wherein the diazo is thiophen-2-yl as defined therein, and the coupler has the formula

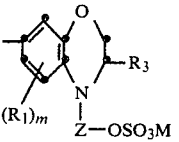

as defined therein.

23. The dye of claim 1 having the formula

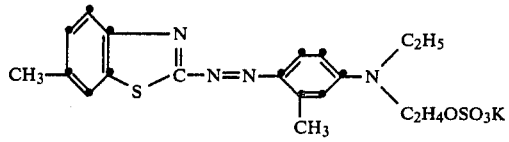

24. The dye of claim 1 having the formula

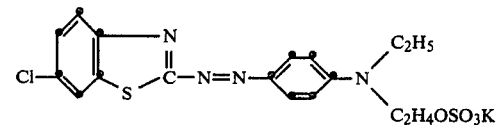

25. The dye of claim 1 having the formula

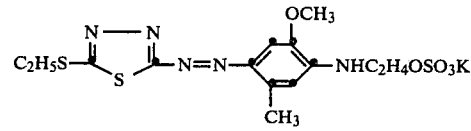

26. The dye of claim 1 having the formula

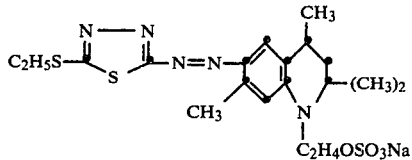

27. The dye of claim 1 having the formula

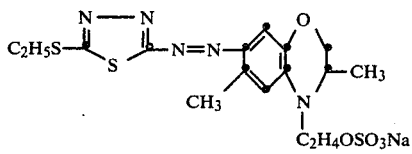

28. The dye of claim 1 having the formula

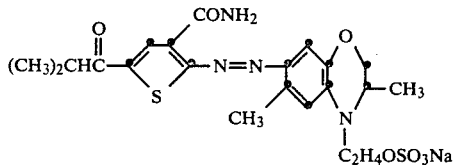

29. The dye of claim 1 having the formula

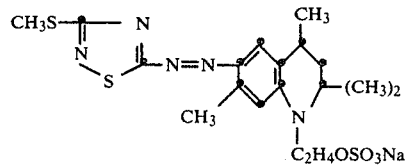

30. The dye of claim 1 having the formula

31. The dye of claim 1 having the formula
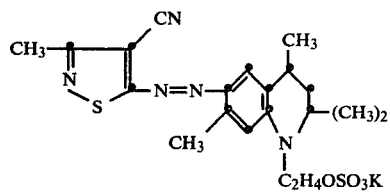
32. The dye of claim 1 having the formula
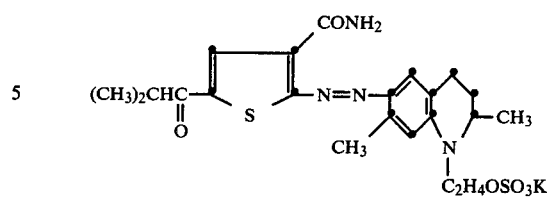
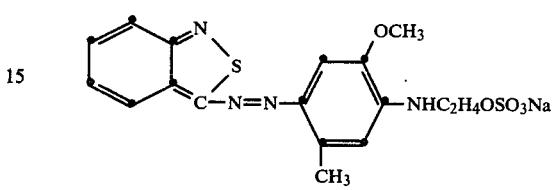
* * * * *